United States Patent
Yamamoto et al.

(10) Patent No.: US 11,248,942 B2
(45) Date of Patent: Feb. 15, 2022

(54) FLOW RATE MEASURING APPARATUS

(71) Applicant: OMRON CORPORATION, Kyoto (JP)

(72) Inventors: Katsuyuki Yamamoto, Kusatsu (JP); Naotsugu Ueda, Funabashi (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/968,312

(22) PCT Filed: Jan. 18, 2019

(86) PCT No.: PCT/JP2019/001495
§ 371 (c)(1),
(2) Date: Aug. 7, 2020

(87) PCT Pub. No.: WO2019/163349
PCT Pub. Date: Aug. 29, 2019

(65) Prior Publication Data
US 2021/0080304 A1 Mar. 18, 2021

(30) Foreign Application Priority Data
Feb. 22, 2018 (JP) .............................. JP2018-029546

(51) Int. Cl.
*G01F 1/696* (2006.01)
(52) U.S. Cl.
CPC .................... *G01F 1/696* (2013.01)
(58) Field of Classification Search
CPC ........................................................ G01F 1/696
See application file for complete search history.

(56) References Cited

U.S. PATENT DOCUMENTS 3,531,980 A * 10/1970 Pennucci ............... G01N 27/16
73/23.31
4,458,709 A 7/1984 Springer
(Continued)

FOREIGN PATENT DOCUMENTS

CN 106133484 A 11/2016
CN 107209043 A 9/2017
(Continued)

OTHER PUBLICATIONS

An English translation of the International Search Report of a related international application PCT/JP2019/001495 dated Mar. 12, 2019.
(Continued)

*Primary Examiner* — Francis C Gray
(74) *Attorney, Agent, or Firm* — Metrolex IP Law Group, PLLC

(57) ABSTRACT

The flow rate measuring apparatus according to one aspect of the present invention is a flow rate measuring apparatus that intermittently measures the flow rate of a fluid, comprising a heating unit for heating the fluid; a control unit that controls a drive voltage for driving the heating unit, or the interval at which the drive voltage is applied, to the desired value; a temperature sensing unit that senses information about the temperature of the heated fluid; and a flow rate measurement unit that measures the flow rate of the fluid on the basis of the sensing signal outputted from the temperature sensing unit, wherein, in intermittently measuring the flow rate, the control unit varies the heating amount of the heating unit in each measurement by varying the interval at which the drive voltage is applied.

5 Claims, 19 Drawing Sheets

(56) References Cited

U.S. PATENT DOCUMENTS

| | | |
|---|---|---|
| 4,501,145 A | 2/1985 | Boegli et al. |
| 6,453,739 B1 | 9/2002 | Saikalis et al. |
| 10,271,766 B1* | 4/2019 | Parker, Jr. ............ A61B 5/6831 |
| 2002/0121137 A1 | 9/2002 | Fujiwara et al. |
| 2005/0261842 A1 | 11/2005 | Yamagishi et al. |
| 2007/0116083 A1* | 5/2007 | Oda ........................ G01F 1/696 |
| | | 374/29 |
| 2007/0251315 A1* | 11/2007 | Sukegawa ............... G01F 1/699 |
| | | 73/204.27 |
| 2017/0115148 A1 | 4/2017 | Sasaki |
| 2017/0276527 A1 | 9/2017 | Chen et al. |
| 2017/0343401 A1 | 11/2017 | Arnold et al. |
| 2020/0400474 A1* | 12/2020 | Yamamoto .............. G01F 1/696 |
| 2021/0080304 A1* | 3/2021 | Yamamoto .............. G01F 1/696 |

FOREIGN PATENT DOCUMENTS

| | | |
|---|---|---|
| CN | 107228693 A | 10/2017 |
| EP | 0698786 A1 | 2/1996 |
| EP | 1144958 B1 | 12/1999 |
| JP | H4-78616 A | 3/1992 |
| JP | 2001-124608 A | 5/2001 |
| JP | 2002-071423 A | 3/2002 |
| JP | 2003-121227 A | 4/2003 |
| JP | 3640334 B2 | 4/2005 |
| JP | 3658321 B2 | 6/2005 |
| JP | 2008-256633 A | 10/2008 |
| JP | 5644674 B2 | 12/2014 |

OTHER PUBLICATIONS

The Written Opinion of a related international application PCT/JP2019/001495 dated Mar. 12, 2019.
An Extended European Search Report ("EESR") dated Oct. 22, 2021 issued for corresponding European patent application No. 19758310.7.
The Chinese Office Action (CNOA) dated on Oct. 22, 2021 for corresponding Chinese patent application No. 201980008696.3.

\* cited by examiner

| | Voltage application interval T | Voltage Application time | Consumed power | Measurement accuracy |
|---|---|---|---|---|
| Mode 1 | T1 (constant) | t 2 | high | high |
| Mode 2 | T1 (constant) | t 1 | low | low |

Technique disclosed in Patent Literature 2

FIG. 10A

| flow rate measuring apparatus 100 |
|---| voltage application time t: short

| Consumed power / Measurement accuracy | | Heater voltage | | |
|---|---|---|---|---|
| | | high | ... | low |
| Voltage application interval T | long | medium/medium | ... | low/low |
| | . | . | ... | . |
| | . | . | ... | . |
| | . | . | ... | . |
| | short | high/high | ... | medium/medium | voltage application time t: medium

| Consumed power / Measurement accuracy | | Heater voltage | | |
|---|---|---|---|---|
| | | high | ... | low |
| Voltage application interval T | long | medium/medium | ... | low/low |
| | . | . | ... | . |
| | . | . | ... | . |
| | . | . | ... | . |
| | short | high/high | ... | medium/medium | voltage application time t: long

| Consumed power / Measurement accuracy | | Heater voltage | | |
|---|---|---|---|---|
| | | high | ... | low |
| Voltage application interval T | long | medium/medium | ... | low/low |
| | . | . | ... | . |
| | . | . | ... | . |
| | . | . | ... | . |
| | short | high/high | ... | medium/medium |

FIG. 10B

FLOW RATE MEASURING APPARATUS

TECHNICAL FIELD

The present invention relates to a flow rate measuring apparatus.

BACKGROUND ART

There is a need to measure the flow rate of a fluid flowing along a flow path. An example of a device for measuring the flow rate is the thermal flow sensor disclosed in Patent Literature 1. There is also a method in which a thermal flow sensor is used to measure the flow rate of a fluid, as in Patent Literature 2 and 3, for example.

CITATION LIST

Patent Literature

Patent Literature 1: Japanese Patent No. 3,658,321
Patent Literature 2: European Patent No. 1,144,958 B1
Patent Literature 3: Japanese Patent No. 5,644,674

SUMMARY

Technical Problem

When a thermal flow sensor is used to measure the flow rate of a fluid, electricity is needed for heating the fluid. That is, the energy cost required for measurement may increase. In view of this, in order to reduce the energy cost, Patent Literature 2 discloses a flow rate measuring apparatus having two measurement modes: a normal measurement mode; and a measurement mode in which the heating time is shorter, the heat diffusion is reduced, and accuracy is diminished. With a flow rate measuring apparatus such as this, the energy cost entailed by measurement can be reduced by using whichever measurement mode is more appropriate.

Also, Patent Literature 3 discloses a flow rate measuring apparatus in which a heater control means allows the heater to emit the minimum amount of heat necessary for causing the sensor circuit to output the minimum sensing signal with which the flow velocity can be recognized. The energy cost is lower with a flow rate measuring apparatus such as this.

However, the flow rate measuring apparatus disclosed in Patent Literature 2 is limited to two measurement modes. This is less convenient because the operation of the flow rate measuring apparatus cannot be finely adjusted.

Also, since the flow rate measuring apparatus disclosed in Patent Literature 3 performs feedback control using a heater resistance value, a calculation area and a storage area are required. That is, hardware costs may be higher with the flow rate measuring apparatus disclosed in Patent Literature 3.

The inventors of the present invention found that although a conventional flow rate measuring apparatus lowers the energy cost, the hardware cost is higher, and the measurement accuracy and the extent of energy cost reduction cannot be finely adjusted, resulting in an apparatus that is less convenient.

The present invention, in one aspect, was conceived in light of this situation, and an object thereof is to provide a highly convenient flow rate measuring apparatus with which the hardware cost is low and measurement accuracy and the extent of energy cost reduction can be finely adjusted.

Solution to Problem

The present invention employs the following configurations in order to solve the above problem.

Specifically, the flow rate measuring apparatus according to one aspect of the present invention is a flow rate measuring apparatus that intermittently measures the flow rate of a fluid, comprising a heating unit for heating the fluid, a control unit that controls a drive voltage for driving the heating unit, or the interval at which the drive voltage is applied, to the desired value, a temperature sensing unit that senses information about the temperature of the heated fluid, and a flow rate measurement unit that measures the flow rate of the fluid on the basis of the sensing signal outputted from the temperature sensing unit, wherein, in intermittently measuring the flow rate, the control unit varies the heating amount of the heating unit in each measurement by varying the interval at which the drive voltage is applied.

With this configuration, the distribution of heat produced by the flow of the fluid can be sensed, and the flow rate of the fluid can be intermittently measured.

Also, with this configuration, since the drive voltage is controlled to the desired value, the extent to which the fluid is heated can be finely adjusted. That is, the flow rate measurement accuracy and the extent of energy cost reduction can be finely adjusted.

Also, with this configuration, the interval at which the drive voltage is applied can also be controlled to the desired value. In intermittently measuring the flow rate, the interval at which the drive voltage is applied can be changed. That is, with this configuration, in intermittently measuring the flow rate, the interval at which the drive voltage is applied can be shortened, so the extent to which the fluid is heated can be increased, and the flow rate measurement accuracy can be improved. Conversely, the interval at which the drive voltage is applied can also be lengthened, which reduces the extent to which the fluid is heated, reduces the measurement accuracy of the flow rate, and lowers the energy cost. That is, with this configuration, the flow rate measurement accuracy and the extent of energy cost reduction can be finely adjusted not only by controlling the drive voltage for driving the heating unit, but also by controlling the interval at which the drive voltage is applied.

Also, with this configuration, the drive voltage of the heating unit and the interval at which the drive voltage is applied can be controlled to various values, and various kinds of intermittent measurement can be carried out.

Also, with this configuration, feedback control is not performed in measuring the flow rate. Therefore, there is no risk that the calculation area and the storage area will increase, and the hardware cost is low.

In the flow rate measuring apparatus according to the above aspect, in the intermittent measurement, the interval at which the drive voltage is applied may be kept constant, and may be shortened in a specific measurement.

With this configuration, in intermittently measuring the flow rate, the extent to which the fluid is heated can be increased in a specific measurement. That is, this configuration can improve the flow rate measurement accuracy in a specific measurement while the flow rate is being intermittently measured. Also, the measurement accuracy can be improved without raising the drive voltage.

In the flow rate measuring apparatus according to the above aspect, in the intermittent measurement, the drive voltage of each measurement may be composed of voltage of one rectangular wave, and in a specific measurement, the drive voltage may be composed of voltage of a plurality of rectangular waves.

With this configuration, the drive voltage can be easily controlled. Also, when the flow rate is measured intermittently, the extent to which the fluid is heated can be increased in a specific measurement. That is, this configuration allows the measurement accuracy to be increased for the flow rate in a specific measurement while the flow rate is being intermittently measured. Also, the measurement accuracy can be improved without raising the drive voltage.

In the flow rate measuring apparatus according to the above aspect, in intermittently measuring the flow rate, the control unit may vary the heating amount of the heating unit in each measurement by varying the drive voltage.

With this configuration, when the flow rate is measured intermittently, the drive voltage itself can be increased, the extent to which the fluid is heated can be increased, and the flow rate measurement accuracy can be improved. Conversely, the drive voltage can also be lowered to reduce the extent to which the fluid is heated to decrease the energy cost.

In the flow rate measuring apparatus according to the above aspect, the apparatus may further comprise a second heating unit, second temperature sensing units provided flanking the second heating unit in the direction of blocking the flow of fluid, and a characteristic measurement unit that measures a characteristic of the fluid on the basis of the sensing signals outputted from the second temperature sensing units, wherein the control unit may further control a second drive voltage for driving the second heating unit, or the interval at which the second drive voltage is applied, to the desired value.

With this configuration, the diffusion of heat attributable to the characteristics of the fluid can be sensed by the second temperature sensing units, and the characteristics of the fluid can be measured intermittently.

Also, with this configuration, the sensing signals outputted from the second temperature sensing units become an output in which the influence of the change in heat distribution caused by the flow of the fluid has been reduced. That is, the characteristics of the fluid measured using the output of the second temperature sensing units will be highly accurate values.

Also, with this configuration, since the second drive voltage that drives the second heating unit is controlled to the desired value, the extent to which the fluid is heated in the vicinity of the second heating unit can be finely adjusted. That is, it is possible to finely adjust the measurement accuracy of the characteristics of the fluid and the extent of energy cost reduction.

Also, with this configuration, the interval at which the second drive voltage is applied is also controlled to the desired value. That is, with this configuration, the interval at which the second drive voltage is applied can be shortened, the extent to which the fluid is heated in the vicinity of the second heating unit can be increased, and the measurement accuracy of the fluid characteristics can be improved. On the contrary, the interval at which the second drive voltage is applied can be lengthened, the extent to which the fluid is heated in the vicinity of the second heating unit reduced, the measurement accuracy of the fluid characteristics reduced, and the energy cost lowered. That is, with this configuration, the measurement accuracy of the fluid characteristics and the extent of energy cost reduction can be finely adjusted not only by controlling the second drive voltage, but also by controlling the interval at which the second drive voltage is applied.

Also, with this configuration, the second drive voltage and the interval at which the second drive voltage is applied can be controlled to various values, and various kinds of intermittent characteristic measurement can be carried out.

Also, with this configuration, feedback control is not performed in measuring the characteristics of a fluid. Therefore, there is no risk that the calculation area and the storage area will increase, and the hardware cost is low.

Advantageous Effects

The present invention provides a highly convenient flow rate measuring apparatus with which the hardware cost is low, and the measurement accuracy and the extent of energy cost reduction can be finely adjusted.

BRIEF DESCRIPTION OF DRAWINGS

FIG. 10A schematically illustrates an example of a measurement mode that can be realized with a conventional flow rate measuring apparatus;

FIG. 10B schematically illustrates an example of various measurement modes that can be realized with the flow rate measuring apparatus according to an embodiment;

DESCRIPTION OF EMBODIMENTS

An embodiment according to an aspect of the present invention (hereinafter, also referred to as "this embodiment") will now be described with reference to the drawings. However, this embodiment described below is merely an example of the present invention in all respects. It should go without saying that various improvements and modifications can be made without departing from the scope of the present invention. That is, in implementing the present invention, a specific configuration according to the embodiment may be appropriately adopted.

§ 1 Application Example

Figure 1:
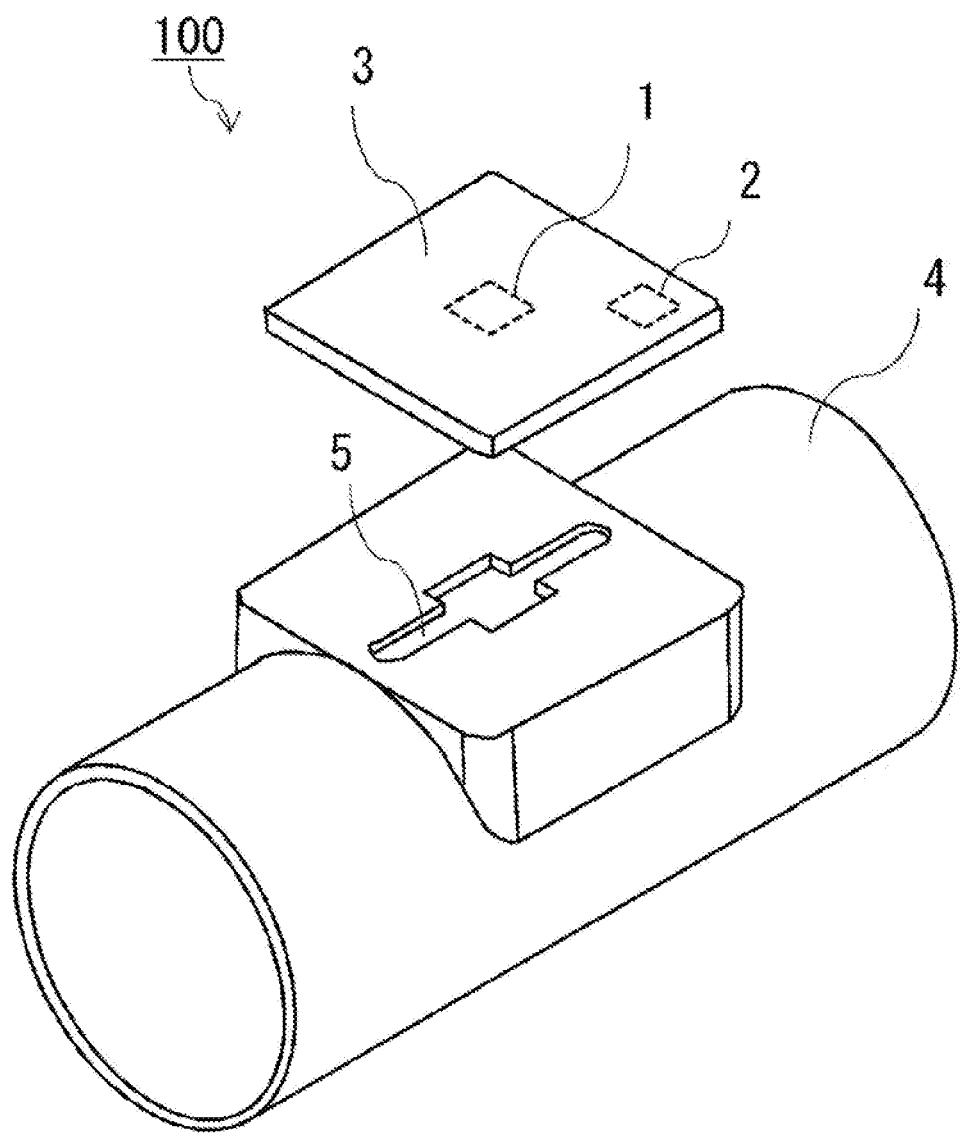
FIG. 1 schematically illustrates an example of a flow rate measuring apparatus according to an embodiment.

An example of a situation in which the present invention is applied will be described with reference to FIG. 1. FIG. 1 schematically illustrates an example of a flow rate measurement device 100 according to this embodiment. The flow rate measurement device 100 comprises a sensing element 1, a control unit 2, and a circuit board 3 on which the sensing element 1 and the control unit 2 are mounted. A certain fluid flows through a flow pipe member 4. One flow path portion 5 is formed at the upper portion of the flow pipe member 4. The flow rate measurement device 100 is fixed to the flow pipe member 4 so that the sensing element 1 is located within the flow path portion 5. Also, the sensing element 1 comprises a micro-heater and thermopiles that are provided flanking the micro-heater, provided side by side and sandwiching the micro-heater. The thermopiles are substantially rectangular in shape. The sensing element 1 is a so-called thermal flow sensor.

Here, the flow rate of the fluid is measured as follows. When the micro-heater is actuated while a fluid is flowing through the flow pipe member 4, the area near the micro-heater is heated. Then, the thermopiles output signals related to the temperature in the vicinity of the micro-heater. When heating is performed by the micro-heater while the fluid is flowing, the heat from the micro-heater is diffused unevenly due to the influence of the flow of the fluid. This biased heat diffusion is sensed by the thermopiles, and the flow rate of the fluid is measured.

The control unit 2 controls the drive voltage of the micro-heater to the desired value. Here, when the drive voltage is high and the degree of heating of the fluid is high, the heat near the micro-heater is well diffused and the flow rate of the fluid is sensed with high accuracy, but the energy cost is higher. On the other hand, when the drive voltage is low and the degree of heating of the fluid is low, the diffusion of heat in the vicinity of the micro-heater is reduced and the measurement accuracy of the flow rate of the fluid is lower, but the energy cost is also lower. That is, with the flow rate measuring apparatus 100, the flow rate measurement accuracy and the extent of energy cost reduction can be finely adjusted by controlling the drive voltage.

The control unit 2 also controls the interval at which the drive voltage is applied to the desired value. Here, if the interval for applying the drive voltage is shortened, the extent to which the fluid is heated increases, the heat in the vicinity of the micro-heater is well diffused, and the flow rate of the fluid is sensed with high accuracy, but the energy cost is higher. Conversely, when the drive voltage application interval is lengthened, heat diffusion in the vicinity of the micro-heater decreases and the fluid flow rate measurement accuracy decreases, but the energy cost is lower. That is, with the flow rate measuring apparatus 100, the flow rate measurement accuracy and the extent of energy cost reduction can be finely adjusted not only by controlling the drive voltage for driving the heating unit, but also by controlling the interval at which the drive voltage is applied.

Also, with the flow rate measuring apparatus 100, the drive voltage of the heating unit and the interval at which the drive voltage is applied can be controlled to various values, and various kinds of intermittent measurement can be carried out. In other words, the flow rate measuring apparatus 100 is a highly convenient device.

Figure 2A:
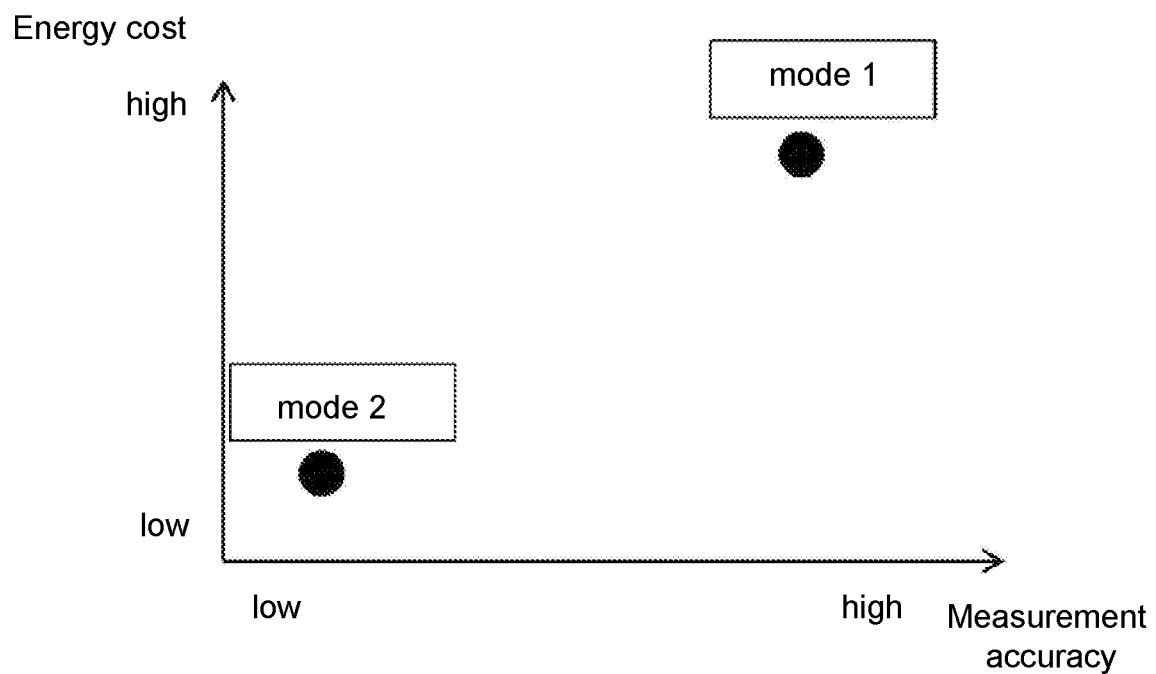
FIG. 2A schematically illustrates an example of flow rate measurement accuracy and the energy cost entailed by flow rate measurement with a conventional flow rate measuring apparatus.
Figure 2B:
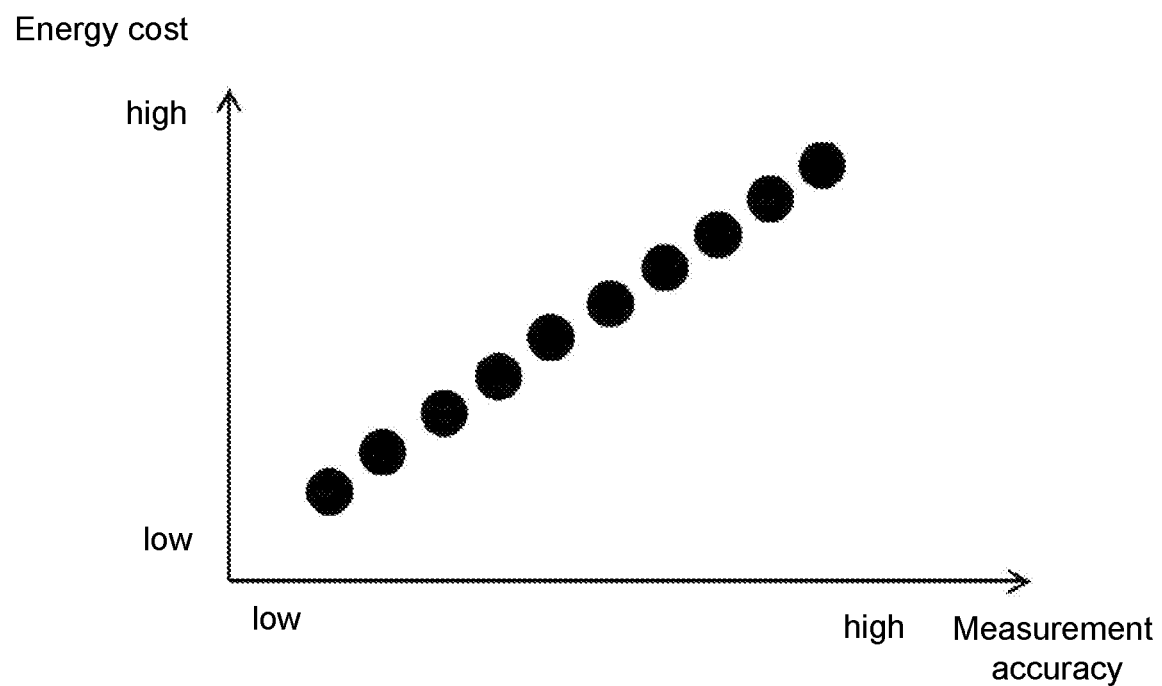
FIG. 2B schematically illustrates an example of flow rate measurement accuracy and the energy cost entailed by flow rate measurement with the flow rate measuring apparatus according to an embodiment.

FIGS. 2A and 2B schematically illustrate an example in which the accuracy of flow rate measurement by the flow rate measuring apparatus 100 and the energy cost required for flow rate measurement are compared with the technique disclosed in Patent Literature 2. As shown in FIG. 2A, the technique disclosed in Patent Literature 2 provides only two measurement modes. Meanwhile, as shown in FIG. 2B, the flow rate measuring apparatus 100 controls the drive voltage or the interval at which the drive voltage is applied to various values to provide a variety of measurement modes related to flow rate measurement accuracy and energy cost. In other words, the flow rate measuring apparatus 100 is a highly convenient device.

Also, with the flow rate measuring apparatus 100, feedback control is not performed in measuring the flow rate. Consequently, there is no risk that the calculation area and the storage area will increase, and the hardware cost is low.

As described above, the flow rate measuring apparatus 100 is a highly convenient device with which the hardware cost is low and the measurement accuracy and the extent of energy cost reduction can be finely adjusted.

§ 2 Configuration Example

Hardware Configuration

Next, an example of the flow rate measuring apparatus according to this embodiment will be described. The flow rate measuring apparatus 100 according to this embodiment is provided in a flow tube inside a gas meter, for example, and can measure the flow rate of gas flowing through the flow tube. As shown in FIG. 1, the flow rate measuring apparatus 100 includes a sensing element 1, a control unit 2, and a circuit board 3 on which the sensing element 1 and the control unit 2 are mounted. Here, the control unit 2 is an example of the "control unit" of the present invention.

Figure 3:
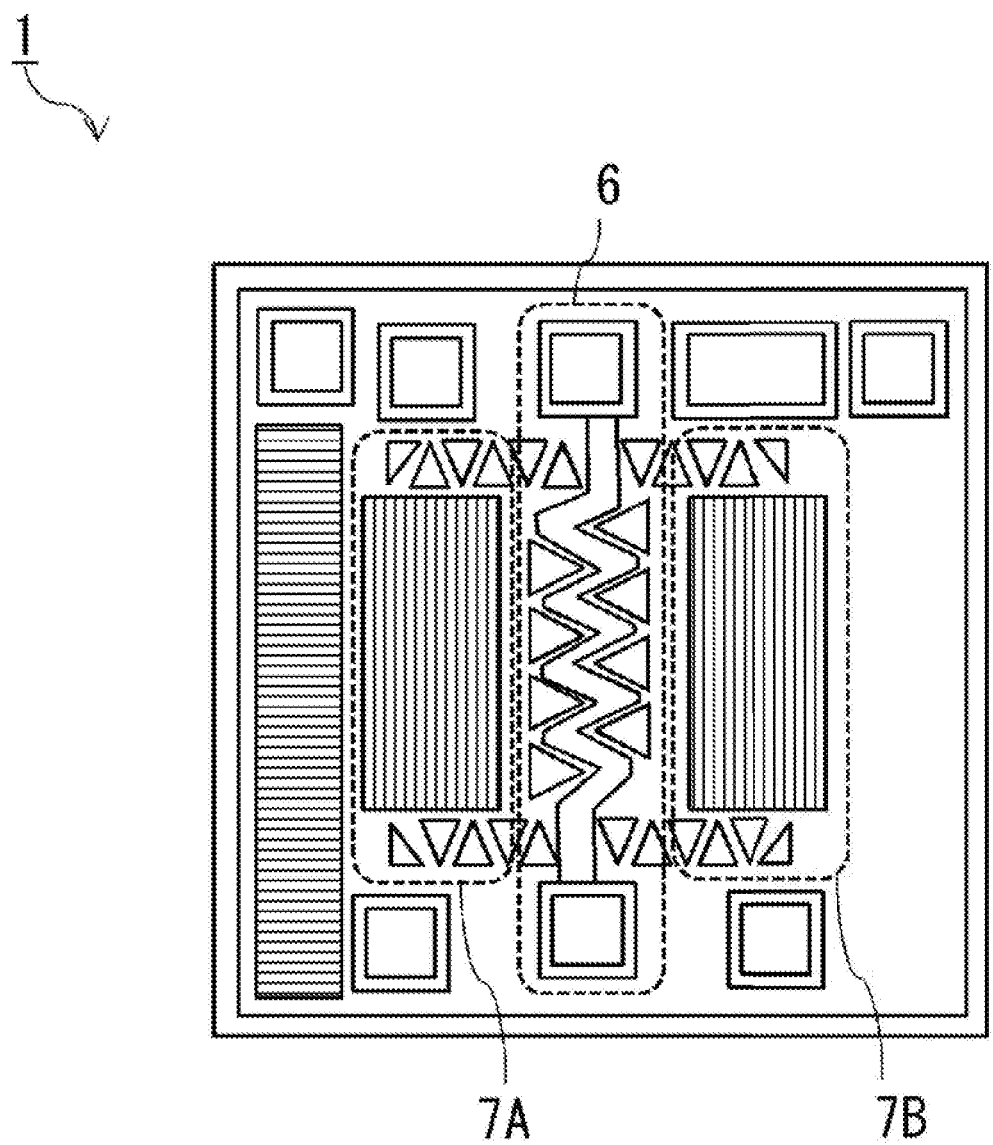
FIG. 3 schematically illustrates an example of a detail view of the sensing element according to this embodiment.

FIG. 3 schematically illustrates an example of a detail view of the sensing element 1 according to this embodiment. The sensing element 1 comprises a micro-heater 6 and thermopiles 7A and 7B. Here, the micro-heater 6 is an example of the "heating unit" of the present invention. The thermopiles 7A and 7B are examples of the "temperature sensing units" of the present invention. The micro-heater 6 is a restrictor made of polysilicon, for example, and is provided in the central portion of the sensing element 1. The thermopiles 7A and 7B are provided flanking the micro-heater 6.

Figure 4:
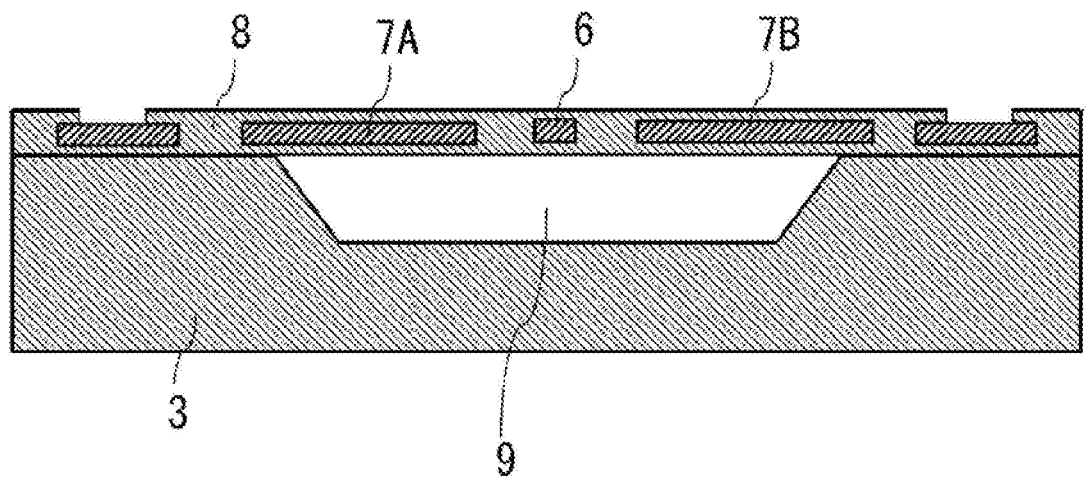
FIG. 4 schematically illustrates an example of a cross section of the flow rate measuring apparatus.
Figure 5:
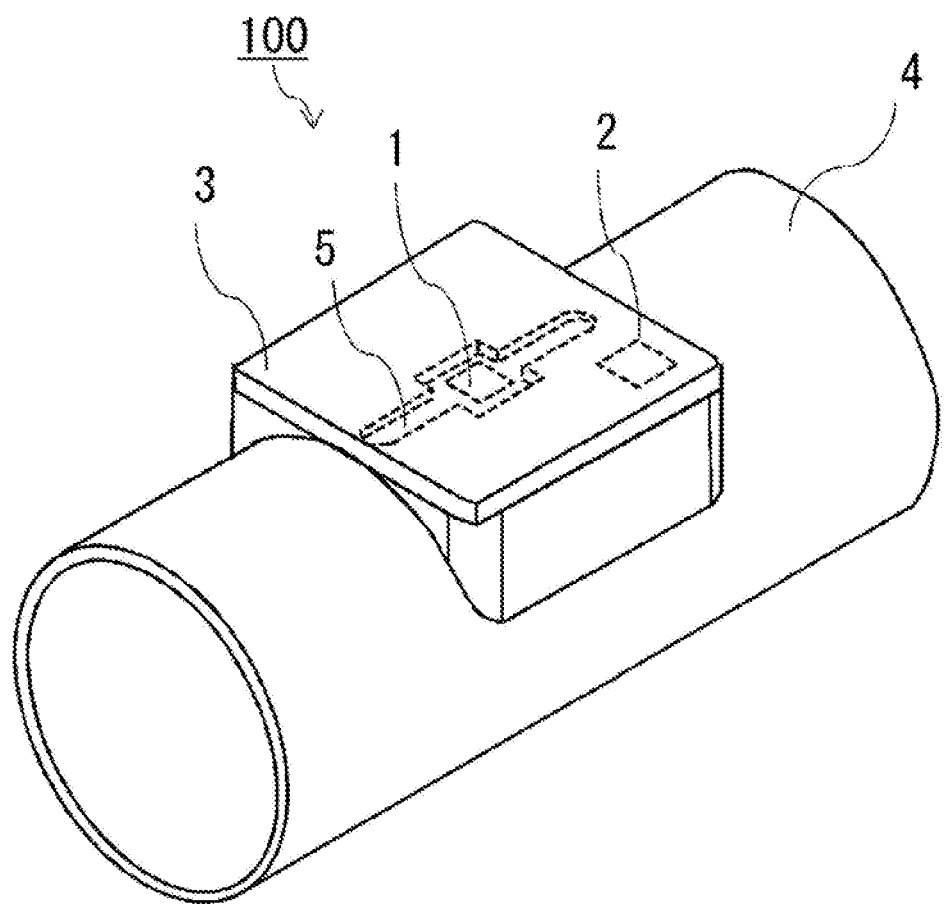
FIG. 5 schematically illustrates an example of a diagram when the flow rate measuring apparatus is fixed to a flow tube member.

FIG. 4 schematically illustrates an example of a cross section of the flow rate measurement device 100. An insulating thin-film 8 is formed above and below the micro-heater 6 and the thermopiles 7A and 7B. A cavity 9 is provided in the circuit board 3 below the thermopiles 7A and 7B. FIG. 5 schematically illustrates an example of a simplified diagram of when the flow rate measurement device 100 is fixed to the flow pipe member 4. The sensing element 1 is installed so as to fit into the central portion of the flow path portion 5. Also, the sensing element 1 is installed so that the thermopile 7A is on the upstream side in the fluid flow direction, and the thermopile 7B is on the downstream side.

Flow Rate Sensing Principle

Figure 6A:
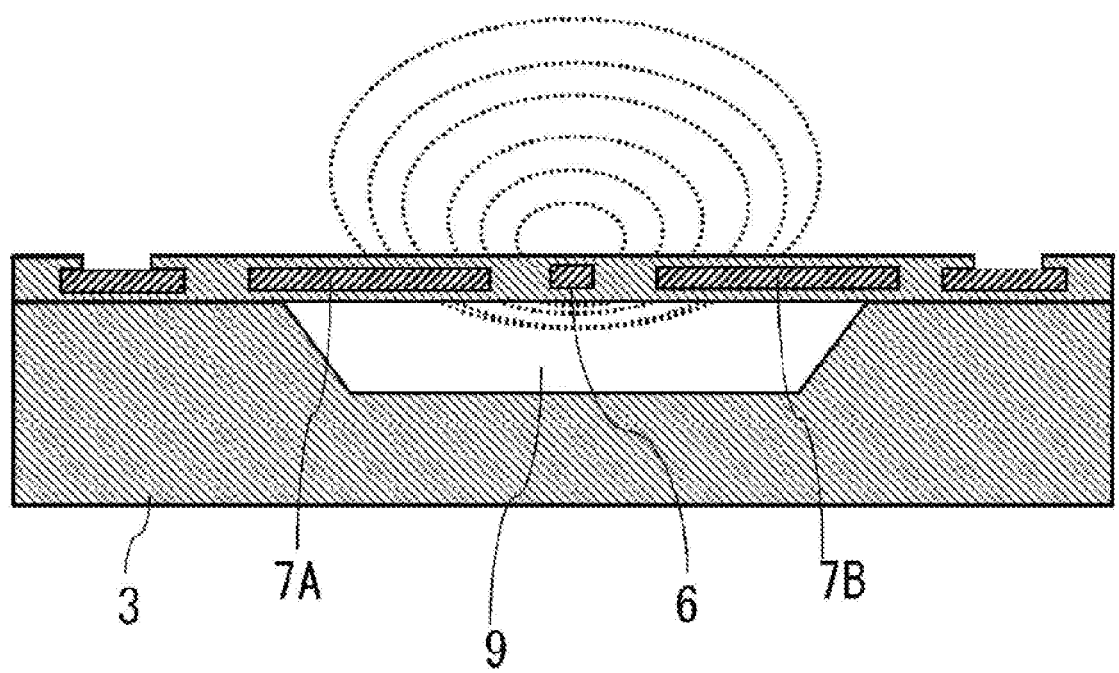
FIG. 6A schematically illustrates an example of the temperature distribution in the vicinity of a micro-heater when the micro-heater is actuated in a state in which no fluid is flowing in the flow tube member.
Figure 6B:
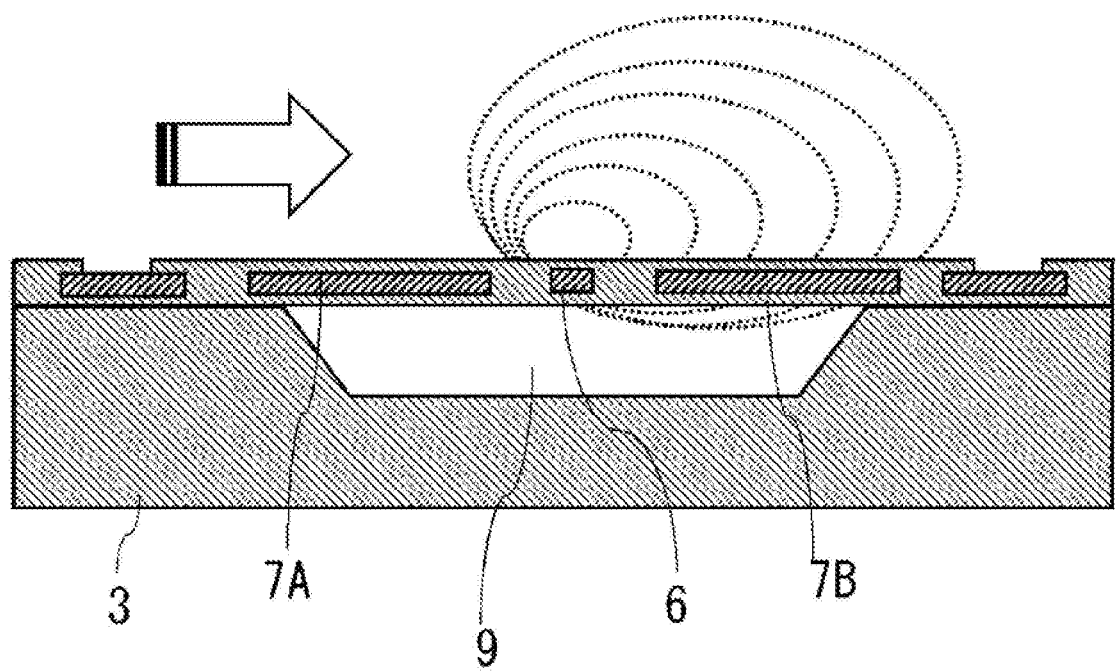
FIG. 6B schematically illustrates an example of the temperature distribution in the vicinity of the micro-heater when the micro-heater is actuated in a state in which fluid is flowing through the flow tube member.

Next, the principle of sensing the flow rate using the sensing element 1 will be described. FIG. 6A schematically illustrates an example of the temperature distribution when the micro-heater 6 is actuated in a state in which no fluid is flowing in the flow pipe member 4. Meanwhile, FIG. 6B schematically illustrates an example of the temperature distribution when the micro-heater 6 is actuated in a state in which a fluid is flowing through the flow pipe member 4. When no fluid is flowing through the flow pipe member 4, the heat from the micro-heater 6 diffuses symmetrically around the micro-heater 6. Therefore, there is no difference between the outputs of the thermopiles 7A and 7B. On the other hand, when a fluid is flowing through the flow pipe member 4, the heat from the micro-heater 6 is affected by the flow of the fluid and does not spread symmetrically around the micro-heater 6, instead diffusing further to the downstream thermopile 7B side. This produces a difference between the outputs of the thermopiles 7A and 7B. Also, the greater is the flow rate of the fluid, the greater is the difference between the outputs. The relation between the fluid flow rate and the difference between the outputs of the thermopiles 7A and 7B is expressed, for example, by the following Formula 1.

$$\Delta V = A \cdot (T_B - T_A)^b \sqrt{v_f}$$ Formula 1

Here, $\Delta V$ is the flow rate of the gas, $T_A$ is the output value from the thermopile 7A, and $T_B$ is the output value from the thermopile 7B. Also, $v_f$ is the flow velocity of the gas, and A and b are constants. In this embodiment, the flow rate is calculated according to the principle discussed above.

[Functional Configuration]

Figure 7:
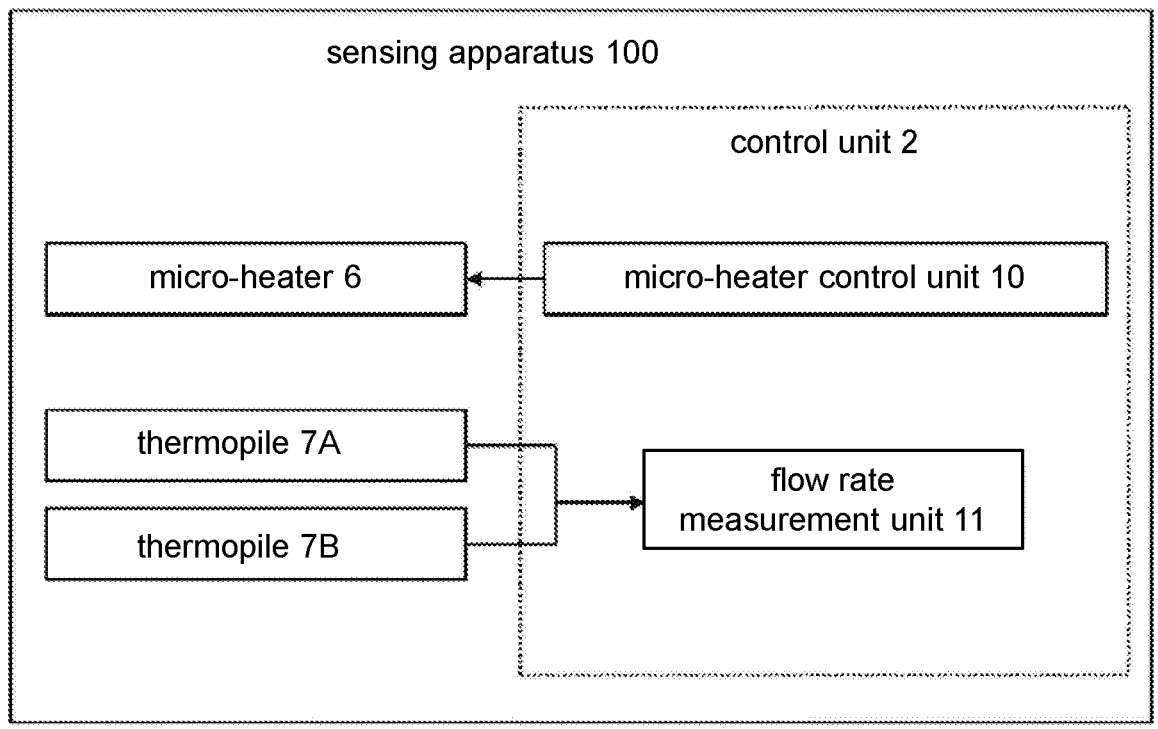
FIG. 7 schematically illustrates an example of a block diagram of the functional configuration of the flow rate measuring apparatus.

FIG. 7 schematically illustrates an example of a block diagram showing the functional configuration of the flow rate measurement device 100. The control unit 2 comprises a flow rate calculation unit 10. This flow rate calculation unit 10 applies drive voltage to the micro-heater 6 on the basis of a predetermined interval for applying the drive voltage. However, the interval at which the drive voltage is applied can be changed and can be any value selected by the user. The micro-heater controller 10 can also control the drive voltage applied to the micro-heater 6. However, the drive voltage can be changed and can be controlled to any value selected by the user.

The control unit 2 also comprises a flow rate measurement unit 11 that receives the signals outputted from the thermopiles 7A and 7B and calculates the gas flow rate from the difference between the outputs of the thermopiles 7A and 7B. The flow rate measurement unit 11 is an example of the "flow rate measurement unit" of the present invention. Formula 1 is used in calculating the gas flow rate from the difference between the outputs of the thermopiles 7A and 7B.

§ 3 Operation Example

Figure 8:
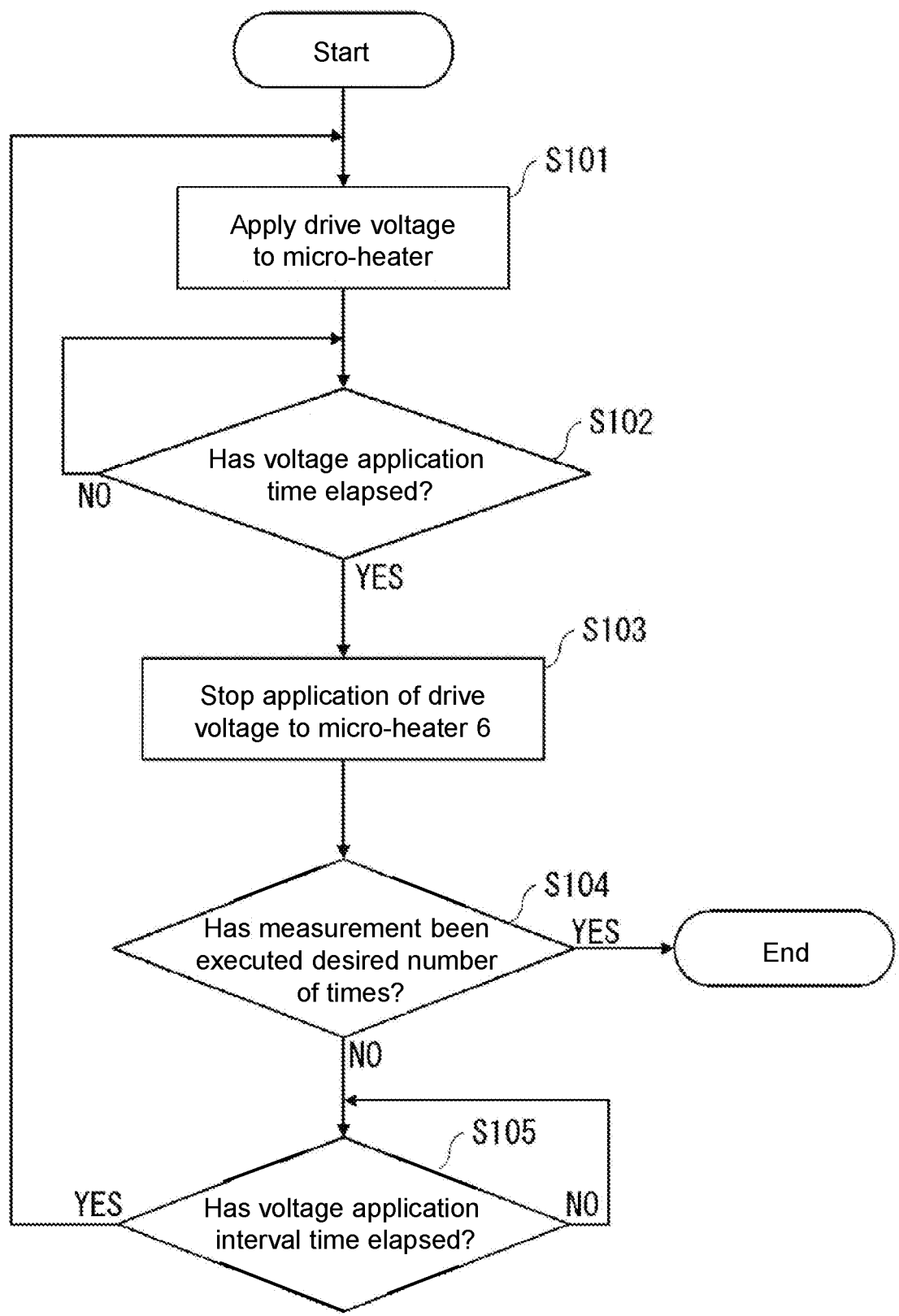
FIG. 8 schematically illustrates an example of a flowchart showing the processing procedure of the flow rate measuring apparatus.

Next, an operation example of the flow rate measurement device 100 will be described with reference to FIG. 8. FIG. 8 schematically illustrates an example of a flowchart showing the processing procedure with the flow rate measurement device 100. The processing procedure described below is merely an example, and the various processing may be changed to the extent possible. Also, in the processing procedure described below, steps can be omitted, replaced, and added as needed according to the embodiment.

Step S201

In step S201, the micro-heater 6 control unit 10 applies drive voltage to the micro-heater 6. This drive voltage has a rectangular wave shape, for example. Then, the gas begins to be heated by the micro-heater 6. The micro-heater controller 10 controls the drive voltage and how long the drive voltage is applied to the micro-heater. Here, the drive voltage and how long the drive voltage is applied to the micro-heater 6 are specific values and are determined in advance.

Step S102

In step S102, the micro-heater control unit 10 determines whether or not the predetermined duration for applying the drive voltage to the micro-heater 6 has elapsed.

Step S103

When the duration for applying the drive voltage has elapsed, the micro-heater control unit 10 stops the application of drive voltage to the micro-heater 6.

Step S104

In step S104, the micro-heater control unit 10 determines whether the desired number of measurements have been performed. If the desired number of measurements have been performed, the measurement is ended.

Step S105

In step S105, the micro-heater control unit 10 determines whether the duration for applying the drive voltage has elapsed. Here, the interval at which the drive voltage is applied is predetermined. When the duration for applying the drive voltage has elapsed, the micro-heater control unit 10 restarts the application of drive voltage to the micro-heater 6.

The measurement of the gas flow rate by the flow rate measurement unit 11 is performed after the drive voltage is applied to the micro-heater 6 in step S101, and up until the time when the heating duration in step S102 elapses. However, the flow rate measuring apparatus 100 can change the drive voltage and the interval at which the drive voltage is applied in the middle of the above measurement. If the interval at which the drive voltage is applied is shortened, the measurement of the gas flow rate by the flow rate measurement unit 11 will be continuously performed even after the heating duration in step S102 has elapsed.

Figure 9A:
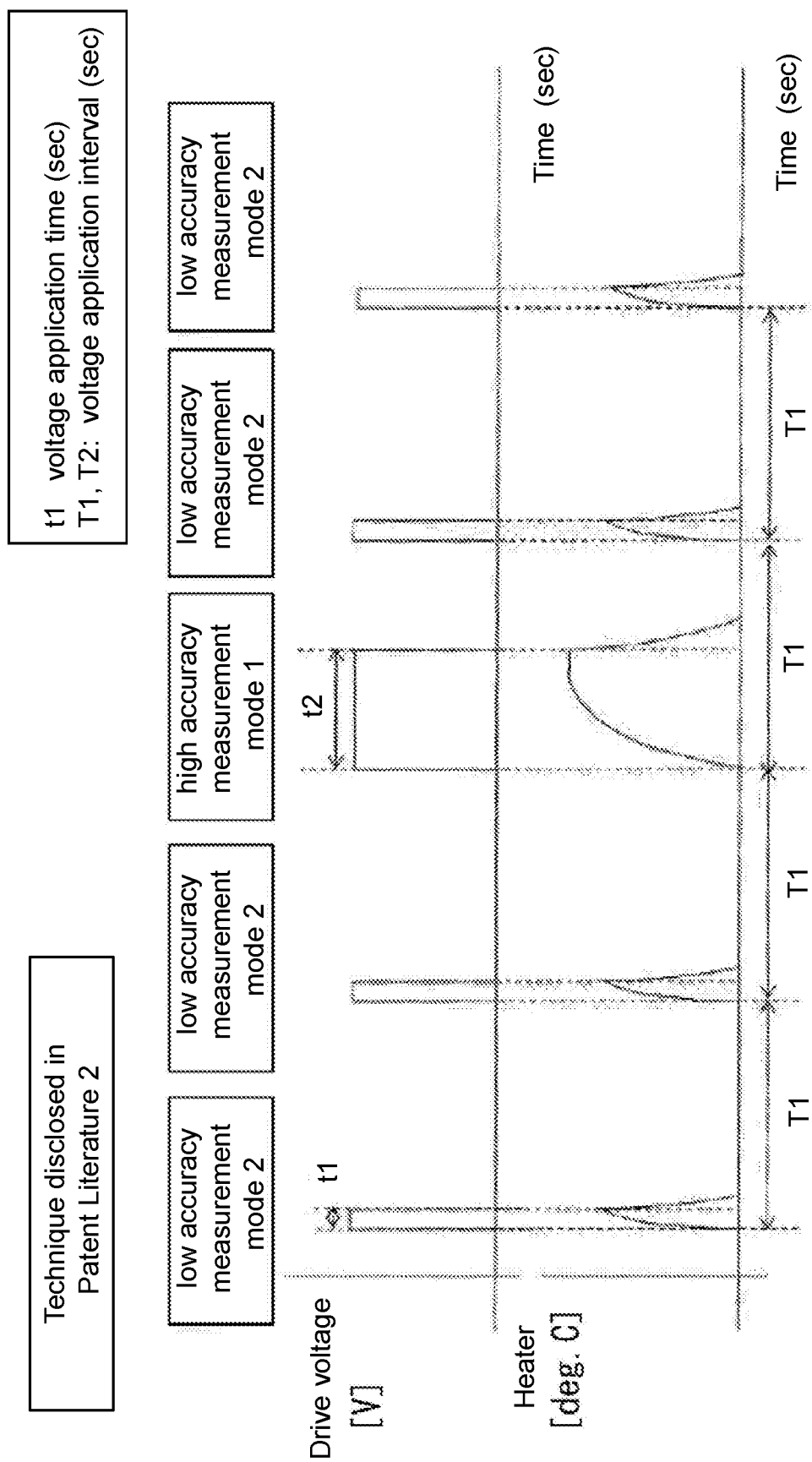
FIG. 9A schematically illustrates an example of intermittent measurement with a conventional flow rate measuring apparatus.
Figure 9B:
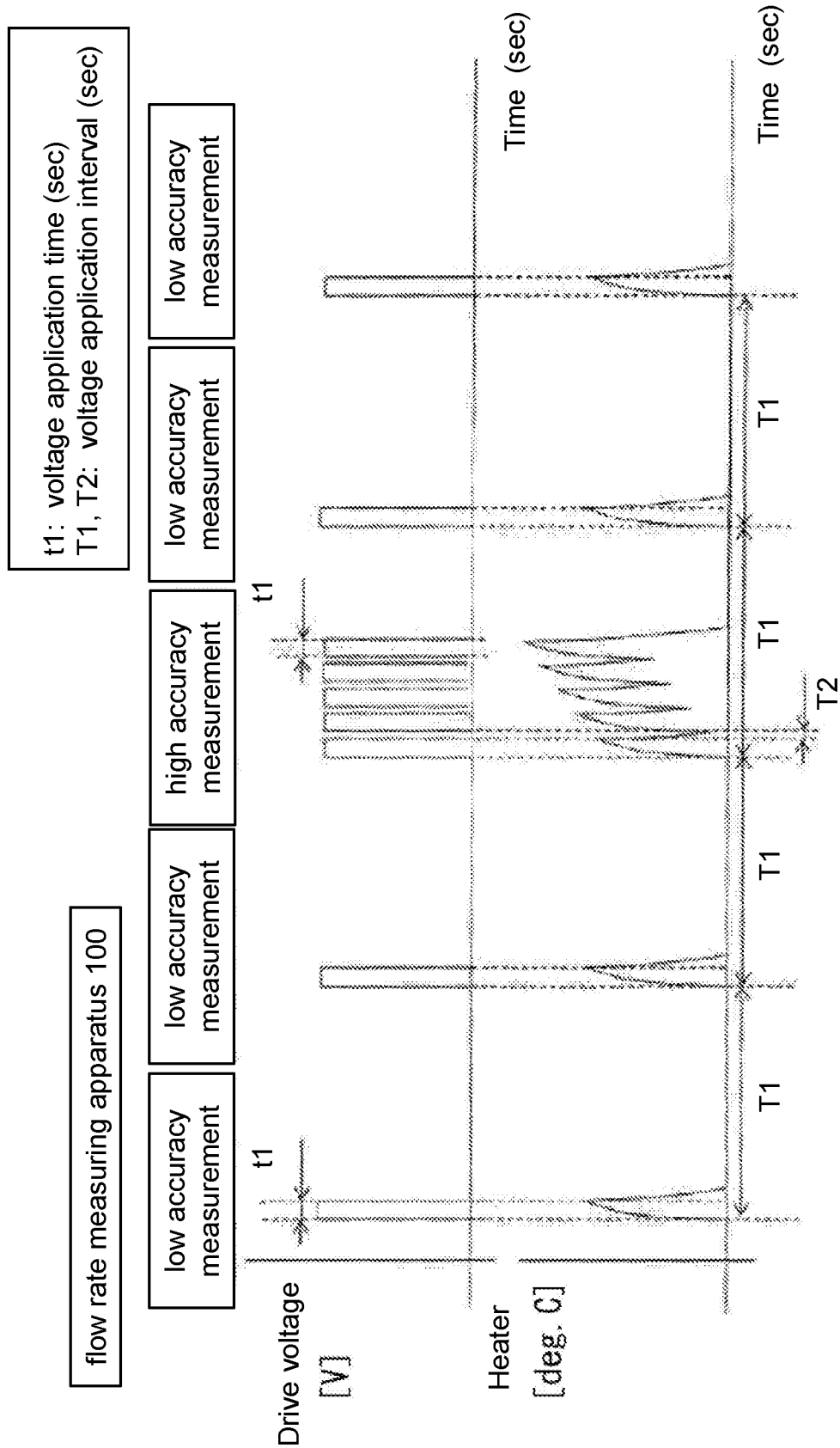
FIG. 9B schematically illustrates an example of intermittent measurement with the flow rate measuring apparatus when the drive voltage application interval is changed.
Figure 9C:
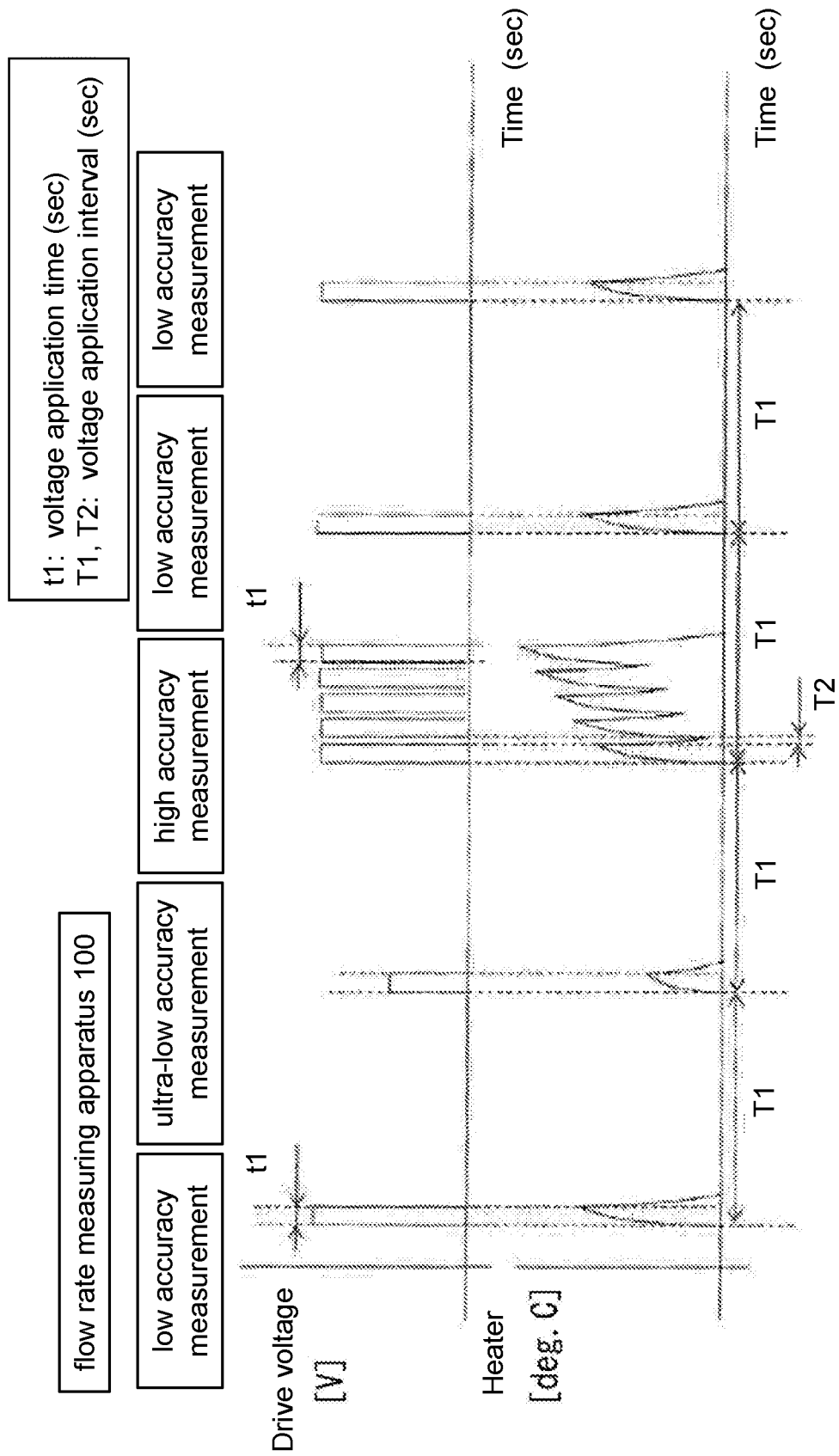
FIG. 9C schematically illustrates an example of intermittent measurement of the flow rate measuring apparatus when the drive voltage and the application interval of the drive voltage are changed.

FIGS. 9A, 9B, and 9C schematically illustrate examples of the drive voltage of the micro-heater 6 and the temperature in the vicinity of the micro-heater 6 when steps S101 to S105 are executed and the drive voltage and the interval at which the drive voltage is applied are changed during the measurement, as compared with the technique disclosed in Patent Literature 2.

As shown in FIG. 9A, with the technique disclosed in Patent Literature 2, the magnitude of the drive voltage and the interval at which the drive voltage is applied are constant. The duration for applying the drive voltage to the heater is then selected from either t1 or t2. However, t1 or t2 cannot be arbitrarily changed. That is, with the technique disclosed in Patent Literature 2, two modes can be executed, namely, a high accuracy measurement mode and a low accuracy measurement mode, but measurement cannot be performed in anything other than these two modes.

On the other hand, with the flow rate measuring apparatus 100 of this embodiment, as shown in FIG. 9B, for example, the interval at which the drive voltage is applied can be changed from T1, in which normal measurement is being performed in the low accuracy measurement mode, to T2, in which the interval at which the drive voltage is applied is shortened. When the drive voltage application interval is changed from T1 to the shorter T2, the micro-heater 6 is driven intermittently, and the gas near the micro-heater 6 is heated more than when the drive voltage application interval is T1. That is, when the drive voltage application interval is T2, the heat near the micro-heater 6 is diffused better than when the interval is T1. If the flow rate of the fluid is measured while the micro-heater 6 is being driven intermittently, the measurement is performed in the high accuracy measurement mode in which the flow rate measurement accuracy is higher. After measurement in the high accuracy measurement mode comes to an end, the interval at which the drive voltage is applied can also be returned to T1, so that measurement is performed in the low accuracy measurement mode.

Also, with the flow rate measuring apparatus 100 of this embodiment, as shown in FIG. 9C, for example, in addition to changing the interval for applying the drive voltage from T1, in which measurement is being performed in the low accuracy measurement mode, to T2, the drive voltage of the micro-heater 6 can also be decreased. When the drive voltage of the micro-heater 6 is reduced, the extent to which the gas is heated near the micro-heater 6 is reduced, so there is less diffusion of heat in the vicinity of the micro-heater 6, making this an ultra-low accuracy measurement mode in which the measurement accuracy is even lower than in the low accuracy measurement mode. After this, when the drive voltage is returned to its original value and the interval for applying the drive voltage is changed to T2, which is shorter than T1, measurement is performed in the high accuracy measurement mode in which the flow rate measurement accuracy is higher, as in FIG. 9B. Then, after measurement in the high accuracy measurement mode is complete, the interval for applying the drive voltage can also be returned to T1, so that measurement is performed in the low accuracy measurement mode.

Action and Effect

As described above, in this embodiment, the flow rate measuring apparatus 100 uses the sensing element 1, which is a thermal flow sensor, to sense the distribution of heat produced by the flow of gas, and can intermittently measure the flow rate of gas.

Also, since the flow rate measuring apparatus 100 controls the drive voltage for driving the micro-heater 6 to the desired value, the extent to which the gas is heated in the vicinity of the micro-heater 6 can be finely adjusted. Therefore, as shown in FIG. 9C, for example, in the intermittent measurement of flow rate, the drive voltage itself can be lowered, the extent to which the fluid is heated can be reduced, and the measurement can be performed in an ultra-low accuracy mode in which the energy cost is lower. Conversely, the drive voltage can also be increased to increase the extent to which the fluid is heated and thereby raise the flow rate measurement accuracy. That is, the flow rate measuring apparatus 100 can finely adjust the flow rate measurement accuracy and the extent of energy cost reduction.

The flow rate measuring apparatus 100 also controls the interval at which the drive voltage is applied to the desired value. That is, as shown in FIGS. 9B and 9C, for example, the flow rate measuring apparatus 100 can shorten the interval for applying the drive voltage in a specific measurement when intermittently measuring the flow rate, and intermittently drive the micro-heater 6. That is, the flow rate measuring apparatus 100 can increase the extent to which the gas is heated and raise the flow rate measurement accuracy without increasing the drive voltage. Conversely, in measuring the flow rate intermittently, in a specific measurement, it is also possible to lengthen the interval for applying the drive voltage, without reducing the drive voltage, and lower the energy cost. That is, with this configuration, the flow rate measurement accuracy and the extent of energy cost reduction can be finely adjusted not only by control of the drive voltage for driving the micro-heater 6, but also by control of the interval at which the drive voltage is applied.

In addition, in performing intermittent drive, the flow rate measuring apparatus 100 is not limited to the examples of FIGS. 9B and 9C, and can control the increase or decrease of the drive voltage and the interval at which the drive voltage is applied to various values, allowing for a variety of measurement modes.

FIG. 10B schematically illustrates an example of various measurement modes that can be used with the flow rate measuring apparatus 100. As shown in FIG. 10A, the technique disclosed in Patent Literature 2 has only two measurement modes because the duration for which the drive voltage is applied to the heater cannot be changed as desired. On the other hand, with the flow rate measuring apparatus 100, the increase or decrease of the drive voltage and the interval of applying the drive voltage can be controlled to various values as shown in FIG. 10B, which allows for a variety of measurement modes.

Also, the flow rate measuring apparatus 100 does not perform feedback control in performing flow rate measurement. This means there is no risk that the calculation area and the storage area will increase.

Also, since the drive voltage is a rectangular wave voltage, it is easier to control.

That is, the flow rate measuring apparatus 100 is a highly convenient device with which the hardware cost is low and the measurement accuracy and the extent of energy cost reduction can be finely adjusted.

§ 4 Modification Examples

An embodiment of the present invention was described in detail above, but the above description is merely an example of the present invention in all respects. It should go without saying that various improvements and modifications can be made without departing from the scope of the present invention. For instance, the following changes are possible. In addition, those components that are the same as in the above embodiment are numbered the same, and description of things that are the same as in the above embodiment will be omitted. The following modification examples can also be combined as needed.

4.1

Figure 11:
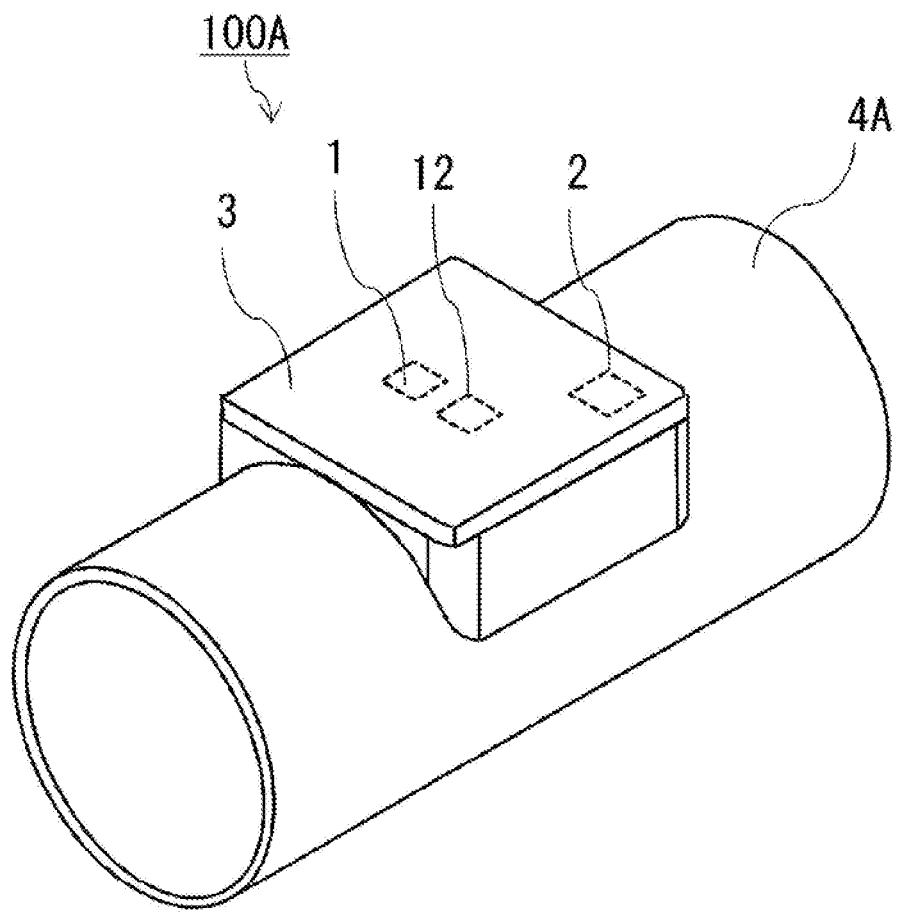
FIG. 11 schematically illustrates an example of an oblique view of the flow rate measuring apparatus and the flow tube member.
Figure 12:
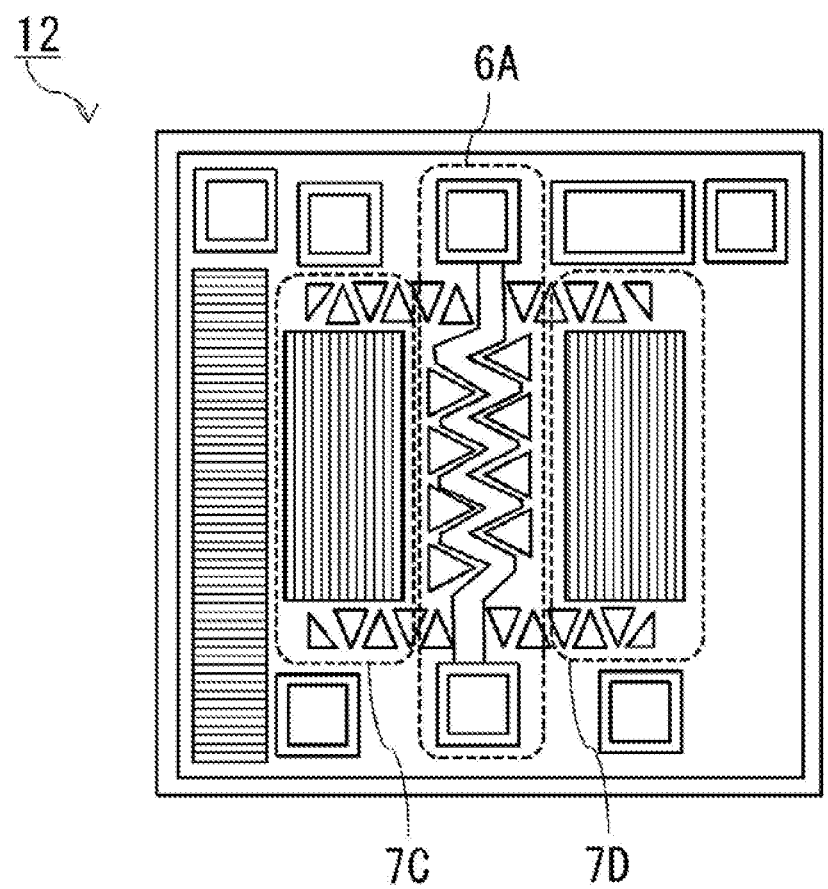
FIG. 12 schematically illustrates an example of the relation between the sensing element and the flow of gas.
Figure 12:
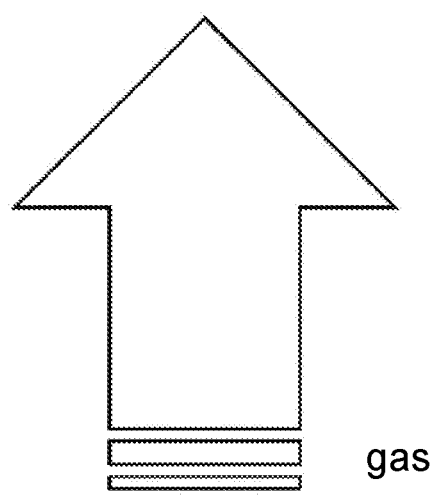

FIG. 11 schematically illustrates an example of an oblique view of a flow rate measurement device 100A and a flow pipe member 4A. As shown in FIG. 12, the flow rate measurement device 100A comprises a sensing element 12 in addition to the sensing element 1 and the control unit 2. Although not depicted, the flow pipe member 4A is provided with one flow path along the flow of the gas, such as the flow path portion 5 of the flow pipe member 4, and the sensing element 1 and the sensing element 12 are provided side by side on this single flow path, in the direction of blocking the flow of gas. The sensing element 12 is a thermal flow sensor of the same type as the sensing element 1, and, like the sensing element 1, comprises a micro-heater 6A and thermopiles 7C and 7D. Here, the micro-heater 6A is an example of the "second heating unit" of the present invention. The thermopiles 7C and 7D are examples of the "second temperature sensing units" of the present invention.

FIG. 12 schematically illustrates an example of the relation between the sensing element 12 and the flow of the gas. The sensing element 12 is provided to one flow path of the flow pipe member 4A, in which the micro-heater 6A and the thermopiles 7C and 7D are arranged in the direction of blocking the flow of the gas.

Here, the diffusion of heat near the micro-heater 6A depends on the characteristics, such as type and temperature, of the gas flowing through the flow tube member 4A. In other words, it is possible to measure characteristics such as gas type and temperature from the temperature information sensed by the thermopile 7C or 7D.

Also, in the case of the sensing element 12, since the temperature distribution is biased toward the downstream side due to the gas flow, the change in the temperature distribution in the direction of blocking the flow is smaller than that in the gas flow direction. Accordingly, changes in the output characteristics of the thermopiles 7C and 7D due to changes in the temperature distribution can be reduced. Therefore, it is possible to reduce the influence of change in the temperature distribution produced by the gas flow, and measure the characteristics with the sensing element 12.

Also, since the longitudinal direction of the micro-heater 6A is disposed along the gas flow direction, the micro-heater 6A can heat the gas over a wide range in the gas flow direction. Accordingly, even if the temperature distribution is biased to the downstream side due to the gas flow, it is possible to reduce the change in the output characteristics of the thermopiles 7C and 7D. Therefore, it is possible to reduce the influence of change in the temperature distribution due to the gas flow, and measure the characteristics with the sensing element 12.

Furthermore, since the longitudinal direction of the thermopiles 7C and 7D is disposed along the gas flow direction, the thermopiles 7C and 7D can sense the temperature over a wide range in the gas flow direction. Accordingly, even if the temperature distribution is biased to the downstream side due to the gas flow, the change in the output characteristics of the thermopiles 7C and 7D can be reduced. Therefore, the characteristics can be measured while reducing the influence of the change in the temperature distribution due to the gas flow.

Figure 13:
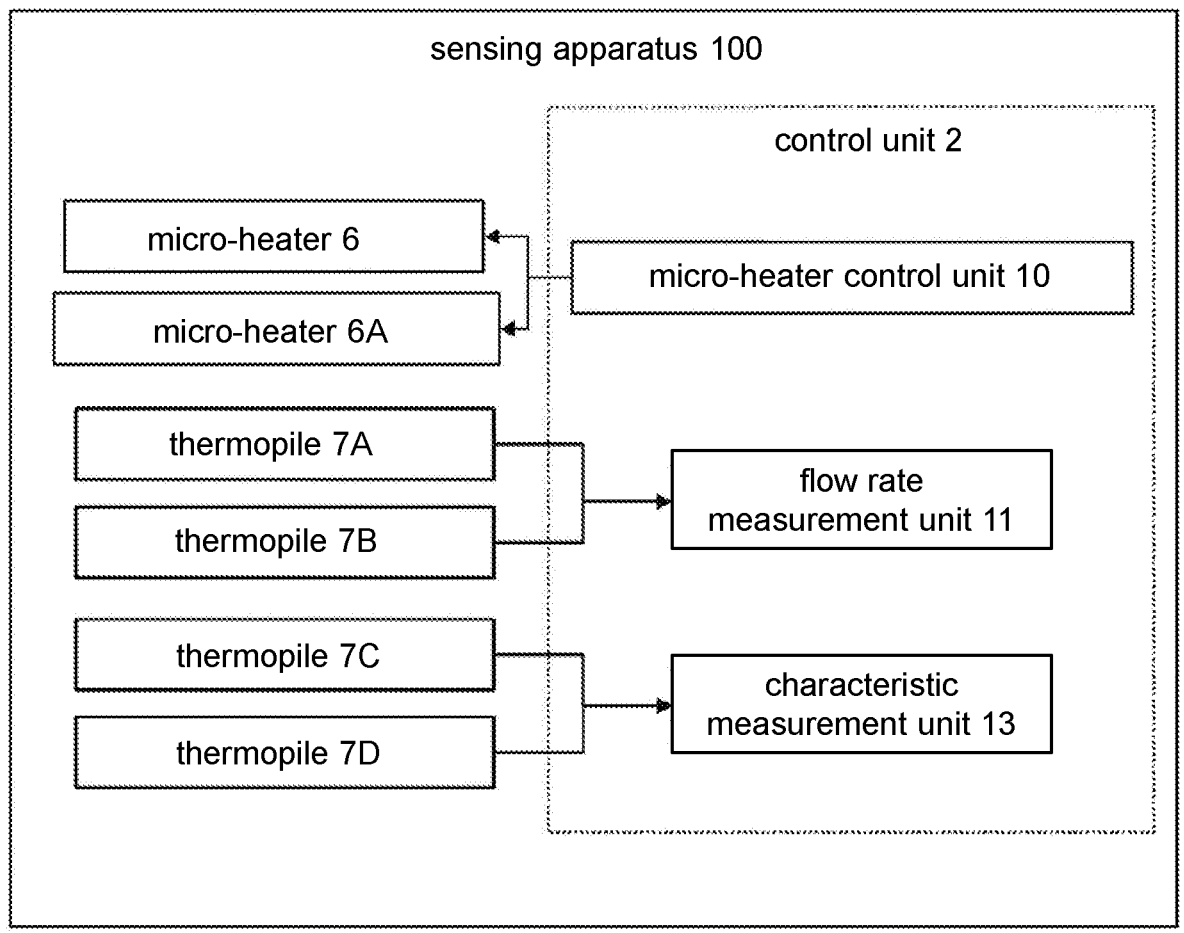
FIG. 13 schematically illustrates an example of a block diagram of the functional configuration of the flow rate measuring apparatus.

FIG. 13 schematically illustrates an example of a block diagram showing the functional configuration of the flow rate measuring apparatus 100A. The control unit 2 comprises a characteristic measurement unit 13 in addition to the flow rate measurement unit 11 and the micro-heater control unit 10. Here, the characteristic measurement unit 13 is an example of the "characteristic measurement unit" of the present invention. The characteristic measurement unit 13 receives the signals outputted from the thermopiles 7C and 7D and calculates characteristics of the gas.

The micro-heater controller 10 also applies a drive voltage to the micro-heaters 6 and 6A on the basis of a predetermined drive voltage application interval. The drive voltage applied to the micro-heater 6A is an example of the "second drive voltage" of the present invention. The micro-heater control unit 10 can control the interval for applying the drive voltage for driving the micro-heater 6 and the interval for applying the drive voltage for driving the micro-heater 6A to the desired values. Also, the micro-heater control unit 10 can control the drive voltage applied to the micro-heaters 6 and 6A to the desired values.

Figure 14:
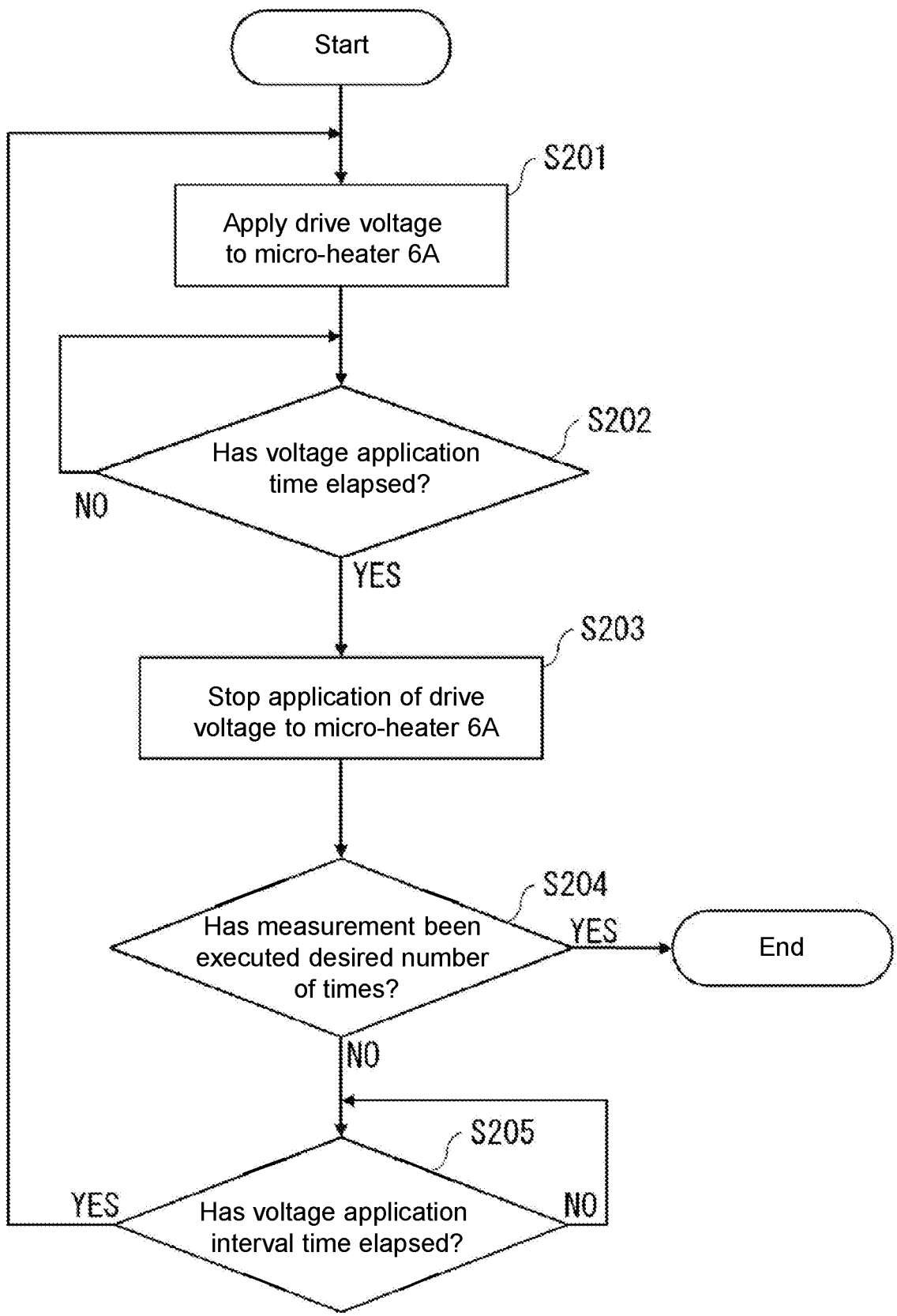
FIG. 14 schematically illustrates an example of a flowchart showing the processing procedure for measuring characteristics with the flow rate measuring apparatus.

FIG. 14 schematically illustrates an example of a flowchart showing the processing procedure for measuring characteristics with the flow rate measuring apparatus 100A. The flow rate measuring apparatus 100A measures the characteristics of the gas according to the characteristic measurement procedure shown in FIG. 14, in addition to the flow rate measurement shown in FIG. 8. This processing procedure is just one example, and the various processing steps may be changed to the extent possible. Also, steps of the processing procedure can be omitted, replaced, and added as needed according to the embodiment.

Step S201

In step S201, the micro-heater control unit 10 applies drive voltage to the micro-heater 6A. The drive voltage has a rectangular wave shape, for example. The heating of the gas by the micro-heater 6A is then started. The micro-heater control unit 10 then controls the drive voltage and the duration for which the drive voltage is applied to the micro-heater 6A. Here, the drive voltage and the duration for which the drive voltage is applied to the micro-heater 6A are specific values that have been determined in advance.

Step S202

In step S202, the micro-heater control unit 10 determines whether or not the predetermined duration for applying the drive voltage to the micro-heater 6A has elapsed.

Step S203

In step S203, the micro-heater control unit 10 stops the application of the drive voltage to the micro-heater 6A.

Step S204

In step S204, the micro-heater control unit 10 determines whether characteristic measurement has been performed the desired number of times. If characteristic measurement has been performed the desired number of times, the measurement is ended.

Step S205

In step S205, the micro-heater control unit 10 determines whether the duration for applying the drive voltage to the micro-heater 6A has elapsed. Here, the duration for which the drive voltage is applied to the micro-heater 6A has been predetermined. If the duration for applying the drive voltage to the micro-heater 6A has elapsed, the micro-heater control unit 10 again begins applying drive voltage to the micro-heater 6A.

The measurement of the gas characteristics by the characteristic measurement unit 13 is performed after the drive voltage is applied to the micro-heater 6A in step S201 and up until the heating duration in step S202 elapses. However, the flow rate measuring apparatus 100A can change the drive voltage applied to the micro-heater 6A and the interval for applying the drive voltage to the micro-heater 6A during the above measurement. If the interval for applying the drive voltage to the micro-heater 6A is shortened, the characteristic measurement unit 13 continues to measure the gas characteristics even after the heating time in S202 described above has elapsed.

Action and Effect

The flow rate measuring apparatus 100A has the following action and effect in addition to the action and effect of the flow rate measuring apparatus 100.

The flow rate measuring apparatus 100A can also sense the diffusion of heat attributable to the characteristics of the gas with the sensing element 12 (a thermal flow sensor), and measure the characteristics of the gas intermittently.

Also, the sensing signals outputted from the thermopiles 7C and 7D are outputs in which the influence of the change in heat distribution due to the gas flow has been reduced. That is, the flow rate measuring apparatus 100A can accurately measure the gas characteristics.

Also, since the flow rate measuring apparatus 100A controls the drive voltage for driving the micro-heater 6A to the desired value, the extent to which the gas is heated in the vicinity of the micro-heater 6A can be finely adjusted. That is, the flow rate measuring apparatus 100A can finely adjust the accuracy at which the gas characteristics are measured and the extent of energy cost reduction.

The flow rate measuring apparatus 100A also controls the interval at which the drive voltage is applied to the micro-heater 6A to the desired value. That is, the flow rate measuring apparatus 100A can shorten the interval for applying the drive voltage to the micro-heater 6A and drive the micro-heater 6A intermittently. That is, the flow rate measuring apparatus 100A can increase extent to which the gas is heated and improve the measurement accuracy of the gas characteristics without raising the drive voltage of the micro-heater 6A. Conversely, the interval for applying the drive voltage to the micro-heater 6A can be lengthened, the extent to which the gas is heated can be reduced, and the energy cost can be lowered, without reducing the drive voltage of the micro-heater 6A. That is, with this configuration, the measurement accuracy of the gas characteristics and the extent of energy cost reduction can be finely adjusted not only by control of the drive voltage for driving the micro-heater 6A, but also by control of the interval for applying the drive voltage to the micro-heater 6A.

Also, the flow rate measuring apparatus 100A can increase or decrease the drive voltage of the micro-heater 6A and adjust the interval at which the drive voltage is applied to the micro-heater 6A to various values in performing intermittent drive, thus allowing various gas characteristic measurement modes to be realized.

Also, the flow rate measuring apparatus 100A does not perform feedback control when measuring the gas characteristics. Therefore, there is no risk that the calculation area and the storage area will increase.

4.2

Figure 15:
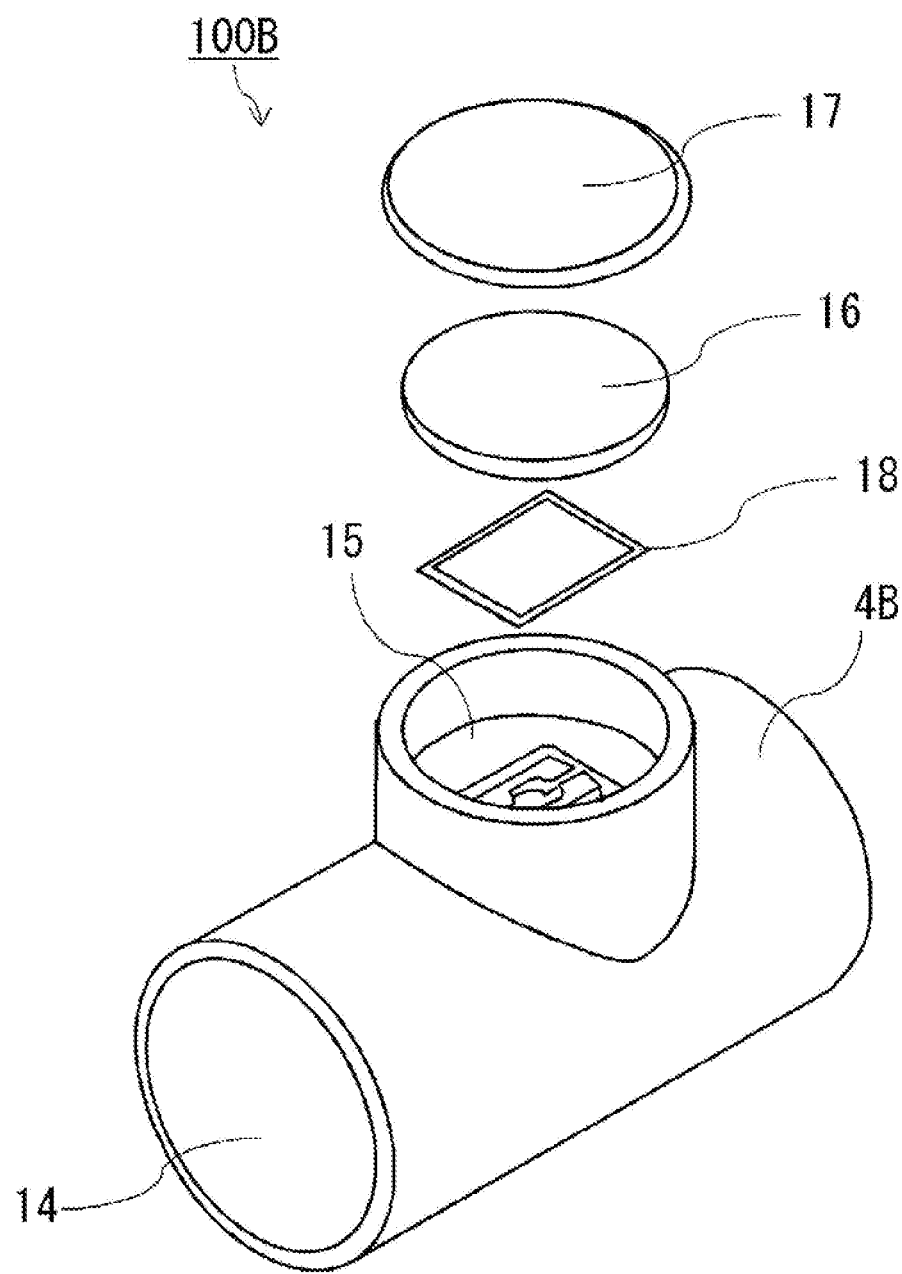
FIG. 15 schematically illustrates an example in which a flow rate measuring apparatus is provided to a flow tube member including two flow path portions: a main flow path portion and an auxiliary flow path portion.

In the modification example in section 4.1, the sensing element 1 and the sensing element 12 are provided on a single flow path of the flow tube member 4A, but the sensing element 1 and the sensing element 12 may be provided to different flow paths. FIG. 15 schematically illustrates an example in which a flow rate measuring apparatus 100B is provided to a flow pipe member 4B comprising the two flow path portions: a main flow path portion 14 and an auxiliary flow path portion 15.

Figure 16:
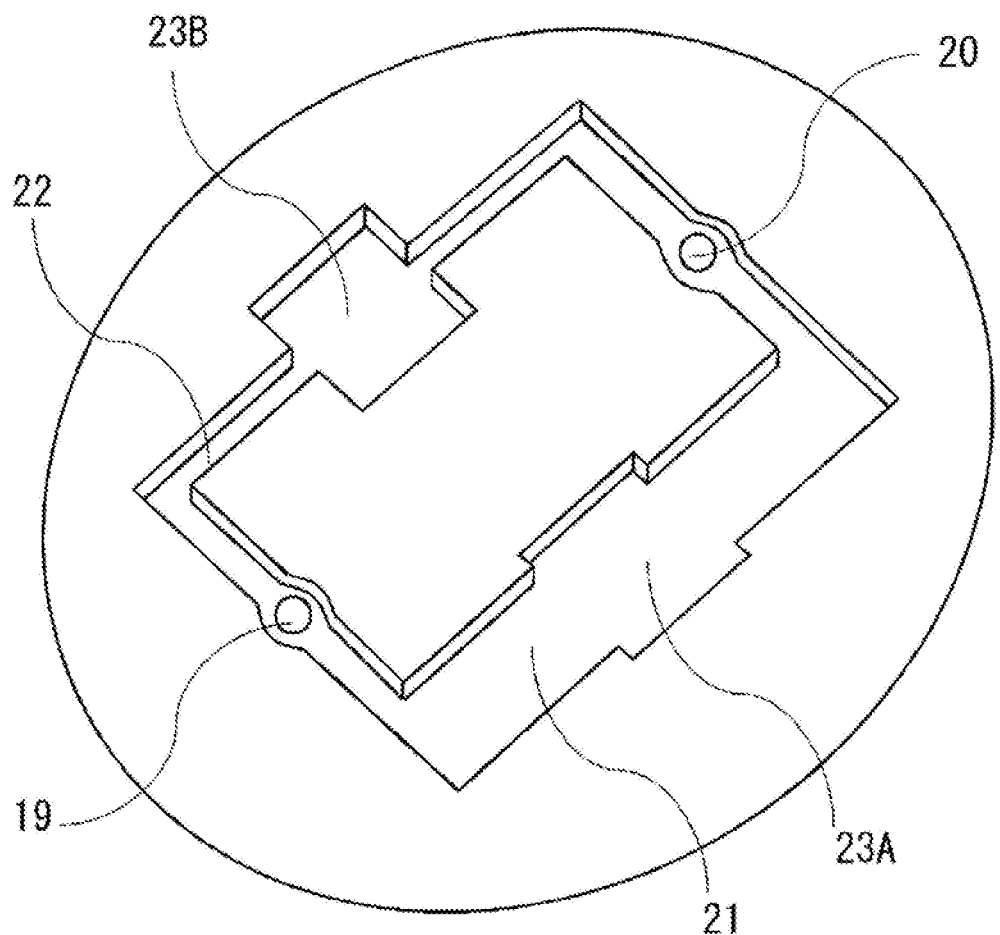
FIG. 16 schematically illustrates an example of a detail view of the auxiliary flow path portion.

Here, the flow rate measuring apparatus 100B comprises a disk-shaped circuit board 16, a cover 17 that covers the outer surface of the circuit board 16, and a seal 18 that affixes the circuit board 16 and the flow tube member 4B. Also, the flow tube member 4B is provided with two flow path portions, a main flow path portion 14 and an auxiliary flow path portion 15. The main flow path portion 14 is a tubular member. The auxiliary flow passage portion 15 is located in the lateral direction of the main flow passage portion 14, and an auxiliary flow passage is formed inside thereof. FIG. 16 schematically illustrates an example of a detail view of the auxiliary flow path portion 15. The main flow path portion 14 and the auxiliary flow path portion 15 communicate with each other via an inflow flow path 19 and an outflow flow path 20. The auxiliary flow path portion 15 branches off from the inflow flow path 19 and comprises a first flow path 21 in which the sensing element 1 is provided, and a second flow path 22 that also branches off from the sensing flow path 19 and in which the sensing element 12 is provided. Further, the first flow path 21 and the second flow path 22 that branch off from the inflow flow path 19 merge to become the outflow flow path 20.

The first flow path 21 is a substantially U-shaped flow path. The first flow path 26 has a sensing element disposition portion 23A, to which is provided the sensing element 1 used for sensing the flow rate of the gas, located at a point along the longitudinal direction (the direction parallel to the main flow path portion 14).

The second flow path 22 is also a substantially U-shaped flow path, like the first flow path 21. The second flow path 27 has a sensing element disposition portion 23B, to which is provided the sensing element 12 that measures the characteristics of the gas, located at a point along the longitudinal direction (the direction parallel to the main flow path portion 14). Here, although not depicted, the micro-heater 6A and the thermopiles 7C and 7D of the sensing element 12 are provided side by side in the direction of blocking the flow of gas.

The method for fixing the flow rate measuring apparatus 100B to the flow pipe member 4B is as follows. First, the auxiliary flow path portion 20 and the circuit board 21 are adhesively affixed by the seal 23. After this, the surface of the circuit board 21 is covered with the cover 22. This fixing method ensures that the inside of the auxiliary flow path portion 20 will be airtight. Consequently, the air outside the flow pipe member 4B will not enter the auxiliary flow path portion 20 and affect the sensing of the flow rate and characteristics.

Figure 17:
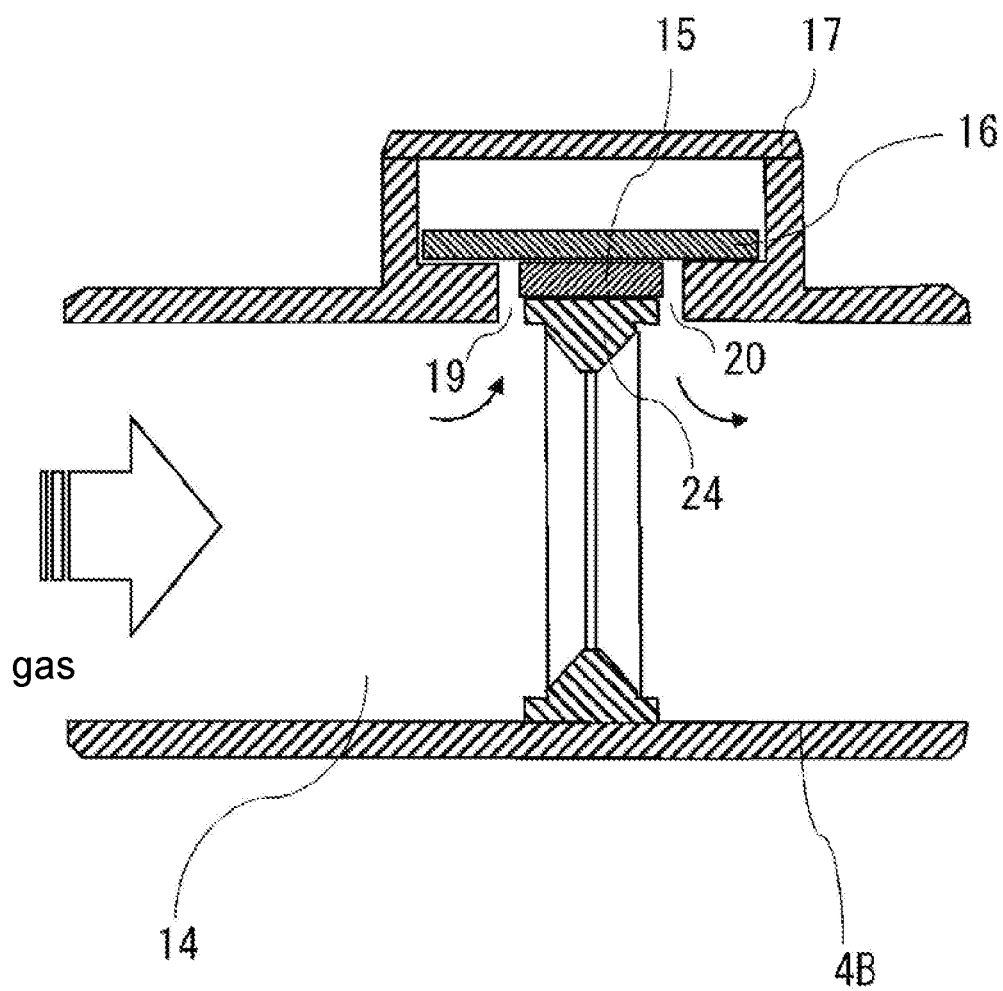
FIG. 17 schematically illustrates an example of a cross section when a flow rate measuring apparatus is provided to a flow tube member.

FIG. 17 schematically illustrates an example of a cross section when the flow rate measuring apparatus 100B is provided to the flow pipe member 4B. The flow pipe member 4B comprises a restrictor 24 in the vicinity of the auxiliary flow path portion 15. When gas flows through the main flow path portion 14, the flow of some of the fluid is blocked by the restrictor 24 and flows through the inflow flow path 19 into the auxiliary flow path portion 15. Then, gas having the same temperature, pressure, and other such physical properties flows into the first flow path 21 and the second flow path 22 branching off from the auxiliary flow path portion 15.

Action and Effect

The flow rate measuring apparatus 100B has the following action and effect in addition to the action and effect of the flow rate measuring apparatus 100A.

With this flow rate measurement device 100B, the flow rate of the gas that is branched off into the first flow path 21 and the second flow path 22 can be individually controlled by adjusting the width of each flow path. Therefore, the flow rate of the gas flowing through the first flow path 21 can be controlled according to the sensing range of the sensing element 1, and the flow rate of the gas flowing through the second flow path 22 can be controlled according to the sensing range of the sensing element 12.

Therefore, the flow rate measuring apparatus 100B can sense the flow rate and the characteristics of the gas at the optimum flow rate according to the unique sensing range of each sensing element. Consequently, the sensing elements 1 and 12 can accurately measure the gas flow rate and characteristics.

Also, with the flow rate measuring apparatuses 100A and 100B, the micro-heater 6A and the thermopiles 7C and 7D are arranged side by side in the direction of blocking the gas flow, but the micro-heater 6A and the thermopiles 7C and 7D may instead be arranged side by side along the gas flow. The characteristics of the gas may then be measured on the basis of the output of the thermopile 7C or 7D.

Also, the flow rate measuring apparatuses 100A and 100B may correct the measured flow rate on the basis of the measured gas characteristics.

Also, with the above flow rate measuring apparatuses 100, 100A, and 100B, the characteristics of the gas may be measured on the basis of the output of the thermopile 7A or 7B.

The embodiments and modification examples disclosed above can be combined with each other.

In addition, in order to allow a comparison of the constituent features of the present invention with the configuration in a working example, the constituent features of the present invention will be described by using the reference numerals in the drawings.

Invention 1

A flow rate measuring apparatus (100) that intermittently measures the flow rate of a fluid, comprising:

a heating unit (6) for heating the fluid;

a control unit (2) that controls a drive voltage for driving the heating unit (6), or the interval at which the drive voltage is applied, to the desired value;

temperature sensing units (7A, 7B) that sense information about the temperature of the heated fluid; and a flow rate measurement unit (11) that measures the flow rate of the fluid on the basis of the sensing signals outputted from the temperature sensing units, wherein, in intermittently measuring the flow rate, the control unit (2) varies the heating amount of the heating unit (6) in each measurement by varying the interval at which the drive voltage is applied.

Invention 2

The flow rate measuring apparatus (100) according to invention 1, wherein, in the intermittent measurement, the interval at which the drive voltage is applied is kept constant, and is shortened in a specific measurement.

Invention 3

The flow rate measuring apparatus (100) according to invention 1 or 2, wherein, in the intermittent measurement, the drive voltage of each measurement is composed of voltage of one rectangular wave, and in a specific measurement, the drive voltage is composed of voltage of a plurality of rectangular waves.

Invention 4

The flow rate measuring apparatus (100) according to any of inventions 1 to 3, wherein, in intermittently measuring the flow rate, the control unit (2) varies the heating amount of the heating unit (6) in each measurement by varying the drive voltage.

Invention 5

The flow rate measuring apparatus (100) according to any of inventions 1 to 4, further comprising:

a second heating unit (6A);

second temperature sensing units (7C, 7D) provided flanking the second heating unit (6A) in the direction of blocking the flow of fluid; and a characteristic measurement unit (13) that measures a characteristic of the fluid on the basis of the sensing signals outputted from the second temperature sensing units (7C, 7D), wherein the control unit (2) further controls a second drive voltage for driving the second heating unit (7C, 7D), or the interval at which the second drive voltage is applied, to the desired value.

REFERENCE SIGNS LIST 1, 12 . . . sensing element
2 . . . control unit
3, 16 . . . circuit board
4, 4A, 4B . . . flow tube member
5 . . . flow path portion
6, 6A . . . micro-heater
7, 7A, 7B, 7C, 7D . . . thermopile
8 . . . insulating thin-film
9 . . . cavity
10 . . . micro-heater control unit
11 . . . flow rate measurement unit
13 . . . characteristic measurement unit
14 . . . main flow path portion
15 . . . auxiliary flow path portion
17 . . . cover
18 . . . seal
19 . . . inflow flow path
20 . . . outflow flow path
21 . . . first flow path
22 . . . second flow path
23A . . . sensing element arrangement part
23B . . . sensing element arrangement part
24 . . . restrictor
100, 100A, 100B . . . flow rate measuring apparatus

The invention claimed is:

1. A flow rate measuring apparatus that intermittently measures the flow rate of a fluid, comprising:
   a heating unit for heating the fluid;
   a control unit that controls a drive voltage for driving the heating unit, and an interval at which the drive voltage is applied, to a desired value;
   a temperature sensing unit that senses information about a temperature of the heated fluid; and
   a flow rate measurement unit that measures the flow rate of the fluid based on a sensing signal outputted from the temperature sensing unit,
   wherein, in intermittently measuring the flow rate, the control unit varies a heating amount of the heating unit in each measurement by varying the interval at which the drive voltage is applied.

2. The flow rate measuring apparatus according to claim 1,
wherein, in the intermittent measurement, the interval at which the drive voltage is applied is kept constant, and is shortened in a specific measurement.

3. The flow rate measuring apparatus according to claim 1,
wherein, in the intermittent measurement, the drive voltage of each measurement is composed of voltage of one rectangular wave, and in a specific measurement, the drive voltage is composed of voltage of a plurality of rectangular waves.

4. The flow rate measuring apparatus according to claim 1,
wherein, in intermittently measuring the flow rate, the control unit varies the heating amount of the heating unit in each measurement by varying the drive voltage.

5. The flow rate measuring apparatus according to claim 1, further comprising:
a second heating unit;
second temperature sensing units provided flanking the second heating unit in a direction of blocking the flow of the fluid; and
a characteristic measurement unit that measures a characteristic of the fluid based on sensing signals outputted from the second temperature sensing units,
wherein the control unit further controls a second drive voltage for driving the second heating unit, or an interval at which the second drive voltage is applied, to a desired value.

* * * * *